United States Patent
Varadarajan et al.

(10) Patent No.: US 11,798,218 B2
(45) Date of Patent: Oct. 24, 2023

(54) METHODS AND APPARATUS FOR PIXEL PACKING

(71) Applicant: Samsung Electronics Co., Ltd., Suwon-si (KR)

(72) Inventors: Keshavan Varadarajan, Austin, TX (US); Veynu Narasiman, Austin, TX (US); David C. Tannenbaum, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 29 days.

(21) Appl. No.: 17/503,259

(22) Filed: Oct. 15, 2021

(65) Prior Publication Data

US 2022/0036634 A1 Feb. 3, 2022

Related U.S. Application Data

(63) Continuation-in-part of application No. 17/168,168, filed on Feb. 4, 2021.

(60) Provisional application No. 63/219,356, filed on Jul. 7, 2021, provisional application No. 63/214,776, filed on Jun. 24, 2021, provisional application No. 63/060,653, filed on Aug. 3, 2020.

(51) Int. Cl.
*G06T 15/00* (2011.01)

(52) U.S. Cl.
CPC ........ *G06T 15/005* (2013.01); *G06T 2210/21* (2013.01)

(58) Field of Classification Search
CPC .......... G06T 1/20; G06T 15/005; G06T 15/80
USPC .................................................. 345/426, 501
See application file for complete search history.

(56) References Cited

U.S. PATENT DOCUMENTS

| 7,502,035 B1 | 3/2009 | Moreton |
| 9,721,376 B2 | 8/2017 | Lentz et al. |

(Continued)

FOREIGN PATENT DOCUMENTS

WO 2020191920 A1 10/2020

OTHER PUBLICATIONS

Office Action for U.S. Appl. No. 17/168,168, dated Nov. 25, 2022.
(Continued)

*Primary Examiner* — Jacinta M Crawford
(74) *Attorney, Agent, or Firm* — Renaissance IP Law Group LLP

(57) ABSTRACT

A method of packing coverage in a graphics processing unit (GPU) may include receiving an indication for a portion of an image, determining, based on the indication, a packing technique for the portion of the image, and packing coverage for the portion of the image based on the packing technique. The indication may include one or more of: an importance, a quality, a level of interest, a level of detail, or a variable-rate shading (VRS) level. The indication may be received from an application. The packing technique may include array merging. The array merging may include quad merging. The packing technique may include pixel piling. The packing technique may be a first packing technique, and the method may further include determining, based on the indication, a second packing technique for the portion of the image, and packing coverage for the portion of the image based on the second packing technique.

19 Claims, 19 Drawing Sheets

(56) References Cited

U.S. PATENT DOCUMENTS

| | | |
|---|---|---|
| 9,779,542 B2 | 10/2017 | Clarberg |
| 9,865,074 B2 | 1/2018 | Berghoff |
| 9,972,124 B2 | 5/2018 | Lentz et al. |
| 10,275,851 B1 * | 4/2019 | Zhao .................... G09G 5/363 |
| 10,769,752 B2 | 9/2020 | Nourai et al. |
| 2017/0032488 A1 | 2/2017 | Nystad |
| 2017/0116698 A1 | 4/2017 | Hakura et al. |
| 2017/0161940 A1 | 6/2017 | Liktor et al. |
| 2017/0309065 A1 | 10/2017 | Lentz et al. |
| 2020/0018965 A1 | 1/2020 | Milner-Moore et al. |
| 2020/0184703 A1 | 6/2020 | Giliberto |
| 2020/0184715 A1 | 6/2020 | Goswami et al. |

OTHER PUBLICATIONS

Notice of Allowance for U.S. Appl. No. 17/168,168, dated Mar. 8, 2023.
Corrected Notice of Allowability for U.S. Appl. No. 17/168,168, dated Jun. 26, 2023.

* cited by examiner

METHODS AND APPARATUS FOR PIXEL PACKING

RELATED APPLICATION DATA

This application is a Continuation-in-Part of U.S. patent application Ser. No. 17/168,168 filed on Feb. 4, 2021 which is incorporated by reference and which claims the benefit of U.S. Provisional Application Ser. No. 63/060,653, filed on Aug. 3, 2020, which is incorporated by reference. This application also claims the benefit of U.S. Provisional Application Ser. No. 63/214,776, filed on Jun. 24, 2021, which is incorporated by reference, and U.S. Provisional Application Ser. No. 63/219,356, filed on Jul. 7, 2021, which are incorporated by reference.

TECHNICAL AREA

The present disclosure relates to graphics processing units (GPUs), and more particularly, to a method for performing shader occupancy for small primitives, and to methods and apparatus for pixel packing.

BACKGROUND

Modern GPUs include a programmable, highly parallel, set of computation engines, and a collection of various fixed-function units. The fixed-function units may include a texture address generation and filtering unit, a primitive clipping unit, a culling unit, a viewport transforming unit, a binning unit, a rasterization setup and rasterization unit, a depth comparison unit, a blending unit, and/or other units. GPUs may be used for graphics-intensive operations and/or compute-intensive workloads.

Graphics data may flow through a GPU in a pipeline fashion, performing steps outlined in one or more Application Programming Interfaces (APIs), such as OpenGL-ES, Vulkan, DirectX, or the like. Accordingly, the GPUs may conform to the standards specified, which may be directed to texture coordinates and texture address generation. More specifically, during a pixel shading stage in the pipeline, a shader program may make texture requests and receive filtered texture data.

In some modes, for each pixel, a directional derivative calculation may be performed in each of the X and Y dimensions to determine the minification or magnification of the texture being accessed with respect to the pixel (or sample) spacing of the coverage. In the context of this disclosure, the term "sample" and the term "pixel" may be used interchangeably insomuch as it is understood that the same operations are performed at either the pixel level or the sub-pixel sample level. Generally, reference will be made herein to pixels rather than samples.

Calculating a directional derivative may use at least two data values in each of the two dimensions. Thus, pixel shaders may operate on 2×2 quads (i.e., blocks of four pixels) as their minimum quantum of work. An input primitive may be a projection of a three-dimensional (3D) primitive onto a two-dimensional (2D) image-space, and rasterized to determine pixel coverage. A primitive may be a triangle defined by a triplet of (x,y) coordinate pairs. Regardless of the actual coverage formed by a given input primitive, work supplied to a parallel processor shader subsystem may be a collection of these 2×2 quads, which may result in a large inefficiency if many of the quads are only partially filled (i.e., partially covered).

One approach for reducing this inefficiency may involve recognizing cases of partial coverage, and transferring the coverage from one adjacent primitive to the quad of another. While this approach may reduce the total number of quads sent to the shader, and thus may help to reduce total energy consumption, such an approach comes at the expense of losing some image quality. The merging of quads may use certain heuristic thresholds applied and set to control its application, thereby attempting to avoid unwanted visual artifacts due to ascribing coverage from one primitive to an adjacent primitive, and as an approximation, using that adjacent primitive's attribute data. Nevertheless, such a quad merge approach remains lossy.

BRIEF SUMMARY

Various embodiments of the disclosure include a GPU, comprising one or more shader cores and a shader warp packer unit. The shader warp packer unit may be configured to receive a first primitive associated with a first partially covered quad, and a second primitive associated with a second partially covered quad. The shader warp packer unit may be configured to determine that the first partially covered quad and the second partially covered quad have non-overlapping coverage. The shader warp packer unit may be configured to pack the first partially covered quad and the second partially covered quad into a packed quad. The shader warp packer unit may be configured to send the packed quad to the one or more shader cores. In some embodiments, the first partially covered quad and the second partially covered quad are spatially disjoint from each other. The term disjoint may imply non-overlapping. The one or more shader cores may be configured to receive and process the packed quad with no loss of information relative to the one or more shader cores individually processing the first partially covered quad and the second partially covered quad.

A method for performing shader occupancy for small primitives using a GPU. The method may include receiving, by a shader warp packer unit, a first primitive associated with a first partially covered quad, and a second primitive associated with a second partially covered quad. The method may include determining, by the shader warp packer unit, that the first partially covered quad and the second partially covered quad have non-overlapping coverage. The method may include packing, by the shader warp packer unit, the first partially covered quad and the second partially covered quad into a packed quad. The method may include sending, by the shader warp packer unit, the packed quad to one or more shader cores. In some embodiments, the first partially covered quad and the second partially covered quad are spatially disjoint from each other. The term disjoint may imply non-overlapping. The method may include receiving and processing, by the one or more shader cores, the packed quad with no loss of information relative to the one or more shader cores individually processing the first partially covered quad and the second partially covered quad.

A method of packing coverage in a graphics processing unit (GPU) may include receiving an indication for a portion of an image, determining, based on the indication, a packing technique for the portion of the image, and packing coverage for the portion of the image based on the packing technique. The indication may include one or more of: an importance, a quality, a level of interest, a level of detail, or a variable-rate shading (VRS) level. The indication may be received from an application. The packing technique may include array merging. The array merging may include quad merging. The packing technique may include pixel piling. The packing technique may include receiving coverage for the portion of the image, and passing the coverage substantially as received to a stage of the GPU. The packing technique may pack coverage from a first primitive and coverage from a second primitive in an array. The packing technique may shift coverage from the first primitive to the second primitive. Determining may include selecting a set of criteria for the packing technique based on the indication, and selecting the packing technique based on the set of criteria. The packing technique may include a merge technique, and the set of criteria may include a depth threshold. The portion of the image may include a first portion of the image, and determining may include comparing the first portion of the image to a second portion of the image. The second portion of the image may include a reference portion. Comparing the first portion of the image to the second portion of the image may include comparing a first quality of the first portion of the image to a second quality of the second portion of the image. Comparing the first portion of the image to the second portion of the image may include comparing a first power consumption of the first portion of the image to a second power consumption of the second portion of the image. Comparing may include comparing in a pseudo running state. Determining may include determining the packing technique for a draw call, and coverage for the portion of the image may be packed based on the packing technique for the draw call. Determining may include determining the packing technique for an image space, and coverage for the portion of the image may be packed based on the packing technique for the image space. The packing technique may include a first packing technique, and the method may further include determining, based on the indication, a second packing technique for the portion of the image, and packing coverage for the portion of the image based on the second packing technique. The first packing technique may store data in a memory, and the second packing technique may use data stored in the memory. Determining may include selecting a first set of criteria for the first packing technique based on the indication, selecting the first packing technique based on the first set of criteria, selecting a second set of criteria for the second packing technique based on the indication, and selecting the second packing technique based on the second set of criteria. The first set of criteria may be for a first part of the portion of the image, and the second set of criteria may be for a second part of the portion of the image. Packing coverage for the portion of the image based on the first packing technique may include placing coverage for two primitives in an array. Packing coverage for the portion of the image based on the second packing technique may include shifting an image element from a first primitive to a second primitive, and placing the image element in the array.

An apparatus may include a graphics processing pipeline including an evaluation stage configured to receive an indication for a portion of an image, and determine, based on the indication, a packing technique for the portion of the image, and a coverage packing stage configured to receive coverage for the portion of the image, and pack the coverage based on the packing technique. The packing technique may include a first packing technique, the evaluation stage may be configured to determine, based on the indication, a second packing technique for the portion of the image, and the coverage packing stage may be configured to pack the coverage based on the second packing technique. The apparatus may further include a memory configured to store data used by the first packing technique, wherein at least a portion of the data used by the first packing technique may be used by the second packing technique.

A method of packing coverage in a graphics processing unit (GPU) may include receiving a first primitive having coverage in an array of image elements, placing a first image element of the first primitive at a first position in the array, receiving a second primitive having coverage in the array, wherein the second primitive has a second image element overlapping with the first image element at the first position in the array, and placing a third image element of the second primitive at a second position in the array. Placing the third image element may be based on receiving an indication for a portion of an image comprising the first primitive and the second primitive. The indication may include a variable-rate shading (VRS) level. The method may further include discarding the second image element of the second primitive.

A method of processing coverage in a graphics processing unit (GPU) may include receiving first coverage for at least a portion of a first primitive, receiving second coverage for at least a portion of a second primitive, wherein the portion of the first primitive and the portion of the second primitive are associated with a portion of an image, receiving an indication for the portion of the image, determining, based on the indication, a technique for combining the first coverage and the second coverage, and combining the first coverage and the second coverage in an array based on the technique. The technique may include array merging. The technique may include pixel piling. The first primitive and the second primitive may belong to the same draw call. The first primitive and the second primitive may belong to different compatible draw calls. The technique may shift coverage from the first primitive to the second primitive. Determining may include selecting a set of criteria for the technique based on the indication, and selecting the technique based on the set of criteria. The portion of the image may include a first portion of the image, and determining may include comparing the first portion of the image to a second portion of the image. The second portion of the image may include a reference portion. Comparing the first portion of the image to the second portion of the image may include comparing a first quality of the first portion of the image to a second quality of the second portion of the image. Comparing the first portion of the image to the second portion of the image may include comparing a first power consumption of the first portion of the image to a second power consumption of the second portion of the image. Comparing may include comparing in a pseudo running state. The technique may include a first technique, and the method may further include determining, based on the indication, a second technique for the portion of the image, and combining coverage for the portion of the image in the array based on the second technique. The first technique may store data in a memory, and the second technique may use data stored in the memory. Determining may include selecting a first set of criteria for the first technique based on the indication, selecting the first technique based on the first set of criteria, selecting a second set of criteria for the second technique based on the indication, and selecting the second technique based on the second set of criteria. The first set of criteria may be for a first part of the portion of the image, and the second set of criteria may be for a second part of the portion of the image. Combining coverage for the portion of the image based on the second technique may include shifting an image element between two primitives.

An apparatus may include a graphics processing pipeline including an evaluation stage configured to receive an indication for a portion of an image, and determine, based on the indication, a packing technique for the portion of the image, and a coverage packing stage configured to receive coverage for the portion of the image, and pack the coverage based on the packing technique. The packing technique may include a first packing technique, the evaluation stage may be configured to determine, based on the indication, a second packing technique for the portion of the image, and the coverage packing stage may be configured to pack the coverage based on the second packing technique.

A method of combining coverage in a graphics processing unit (GPU) may include receiving a first primitive having coverage in an array of image elements, placing a first image element of the first primitive at a first position in the array, receiving a second primitive having coverage in the array, wherein the second primitive has a second image element overlapping with the first image element at the first position in the array, and placing a third image element of the second primitive at a second position in the array. Placing the third image element may be based on receiving an indication for a portion of an image comprising the first primitive and the second primitive.

A method of processing coverage in a graphics processing unit (GPU) may include receiving, from a first stage of a GPU pipeline, coverage for a portion of an image, receiving, through an interface to the GPU pipeline, an indication for the portion of the image, determining, based on the indication, a packing technique for the portion of the image, packing coverage for the portion of the image into an array based on the packing technique, and sending the array to a second stage of the GPU pipeline.

A method of processing coverage in a graphics processing unit (GPU) may include receiving, from a first stage of a GPU pipeline, first coverage for at least a portion of a first primitive and second coverage for at least a portion of a second primitive, wherein the portion of the first primitive and the portion of the second primitive are associated with a portion of an image, receiving an indication for the portion of the image, determining, based on the indication, a technique for combining the first coverage and the second coverage, combining the first coverage and the second coverage in an array based on the technique, and sending the array to a second stage of the GPU pipeline.

BRIEF DESCRIPTION OF THE DRAWINGS

The foregoing and additional features and advantages of the present disclosure will become more readily apparent from the following detailed description, made with reference to the accompanying figures, in which.

DETAILED DESCRIPTION

Figure 1A:
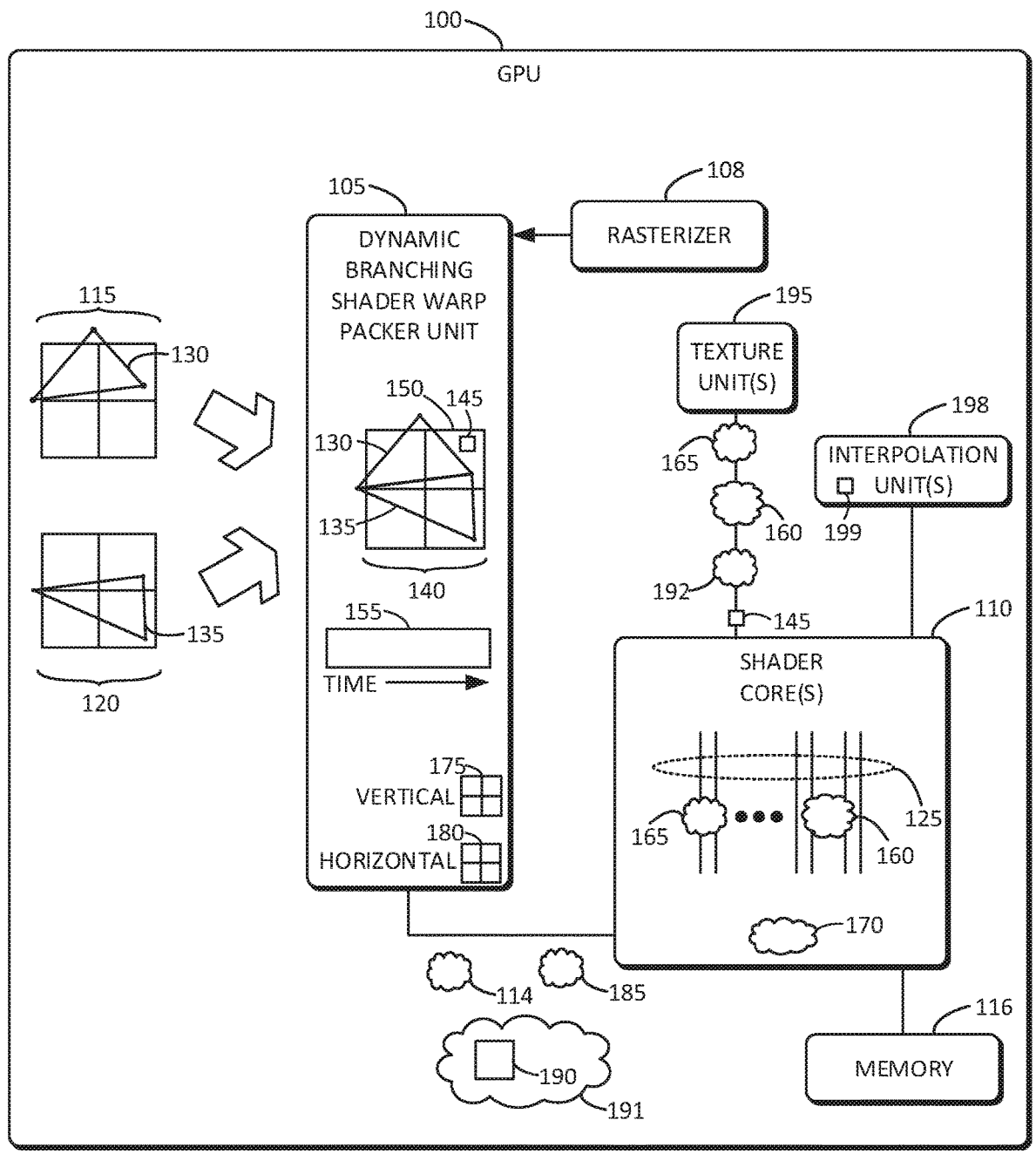
FIG. 1A illustrates a block diagram of a GPU including a dynamic branching pixel shader warp packer unit in accordance with some embodiments.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first pixel could be termed a second pixel, and, similarly, a second pixel could be termed a first pixel, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some embodiments disclosed herein may include a technique for performing shader occupancy for relatively small primitives. In cases in which multiple primitives' coverage is placed into the same 2×2 quad, additional information may be packaged along with each pixel in the quad, thereby allowing for calculations that may be needed for directional derivative calculations. The technique may include full packing of quads from potentially separate primitives, along with auxiliary information that can be used to produce information that would have otherwise been produced by missing "helper" pixels or "H" pixels in the 2×2 quads, thereby increasing processing efficiency.

Some embodiments disclosed herein improve the efficiency of graphics-intensive operations within a GPU, which may involve the use of programmable units and/or fixed-function units within the GPU. Embodiments disclosed herein may not transfer coverage from one primitive to another, but instead, may provide mechanisms in which coverage from two or more primitives may exist in the same quad, without losing any precision. In addition, no associated heuristic thresholds are needed to maintain image quality. Additional information may be present, and calculations may occur, for the pixels within a quad that has coverage from more than one incoming primitive. Accordingly, small primitive processing efficiency may be improved. Moreover, the use of small and micro-polygons may be increased, thereby resulting in higher geometric complexity and fidelity, such as when used with graphic-intensive gaming applications.

Figure 1B:
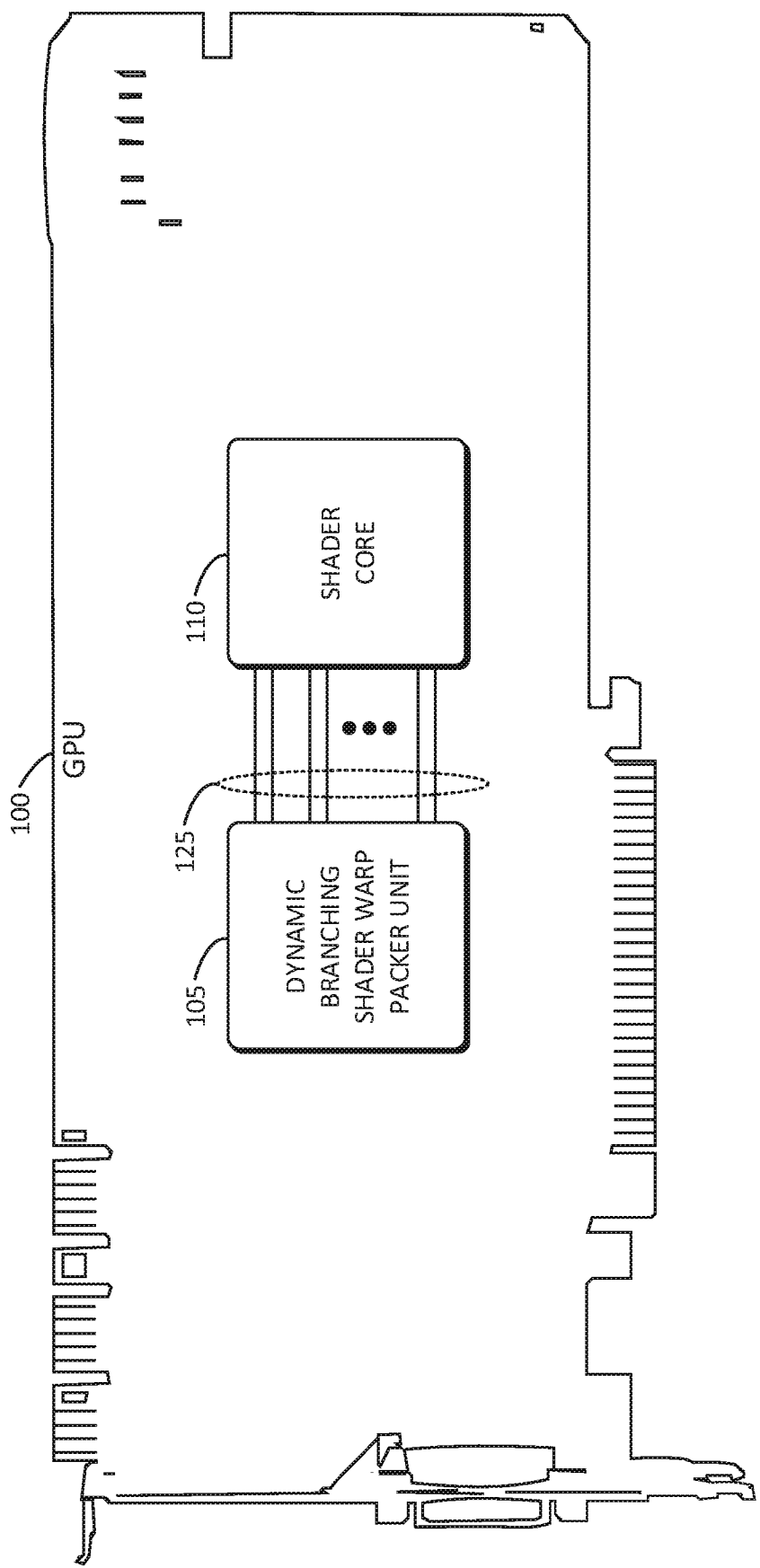
FIG. 1B illustrates a GPU including the dynamic branching pixel shader warp packer unit of FIG. 1A in accordance with some embodiments.
Figure 1C:
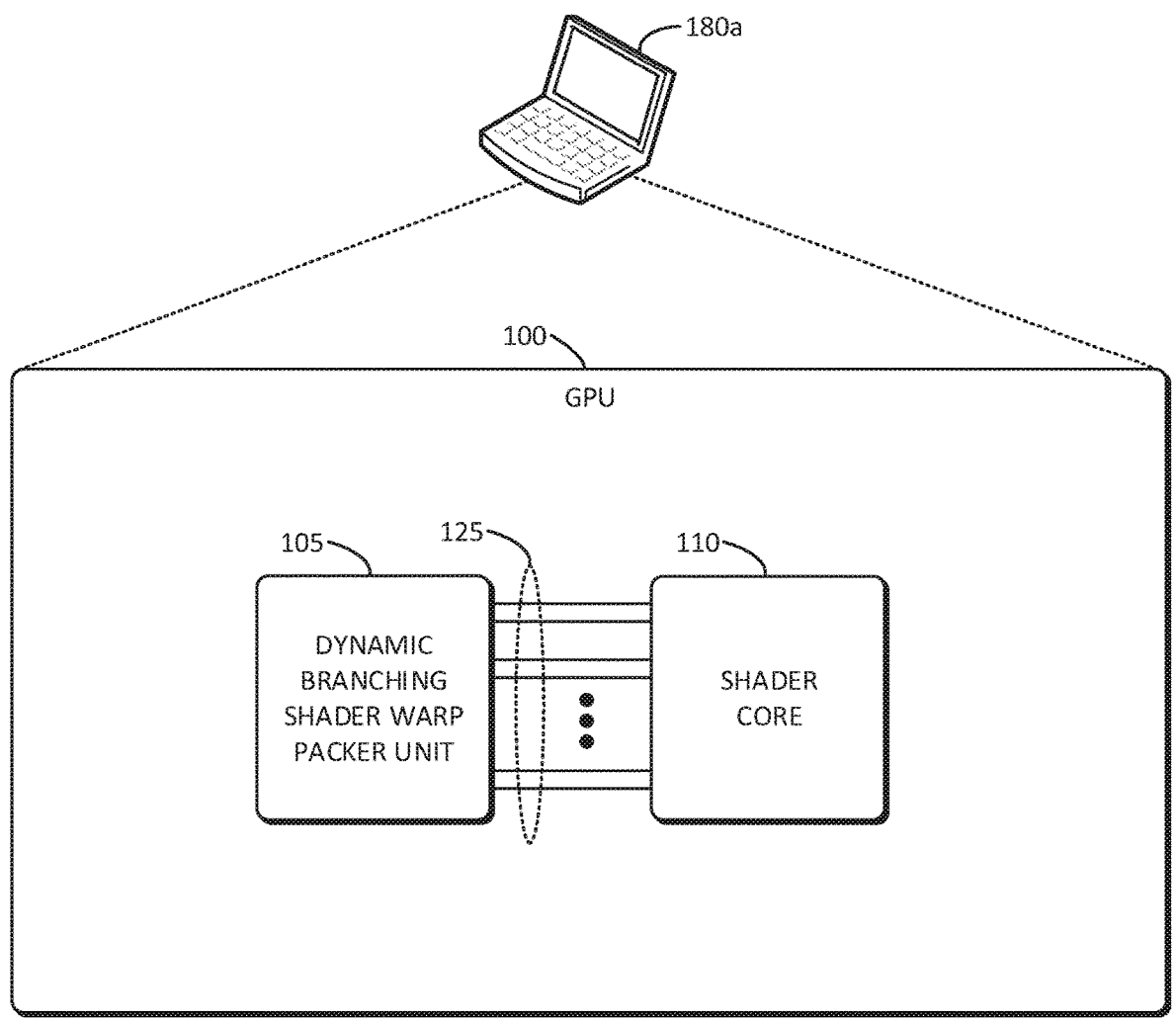
FIG. 1C illustrates a mobile personal computer including a GPU having the dynamic branching pixel shader warp packer unit of FIG. 1A in accordance with some embodiments.
Figure 1D:
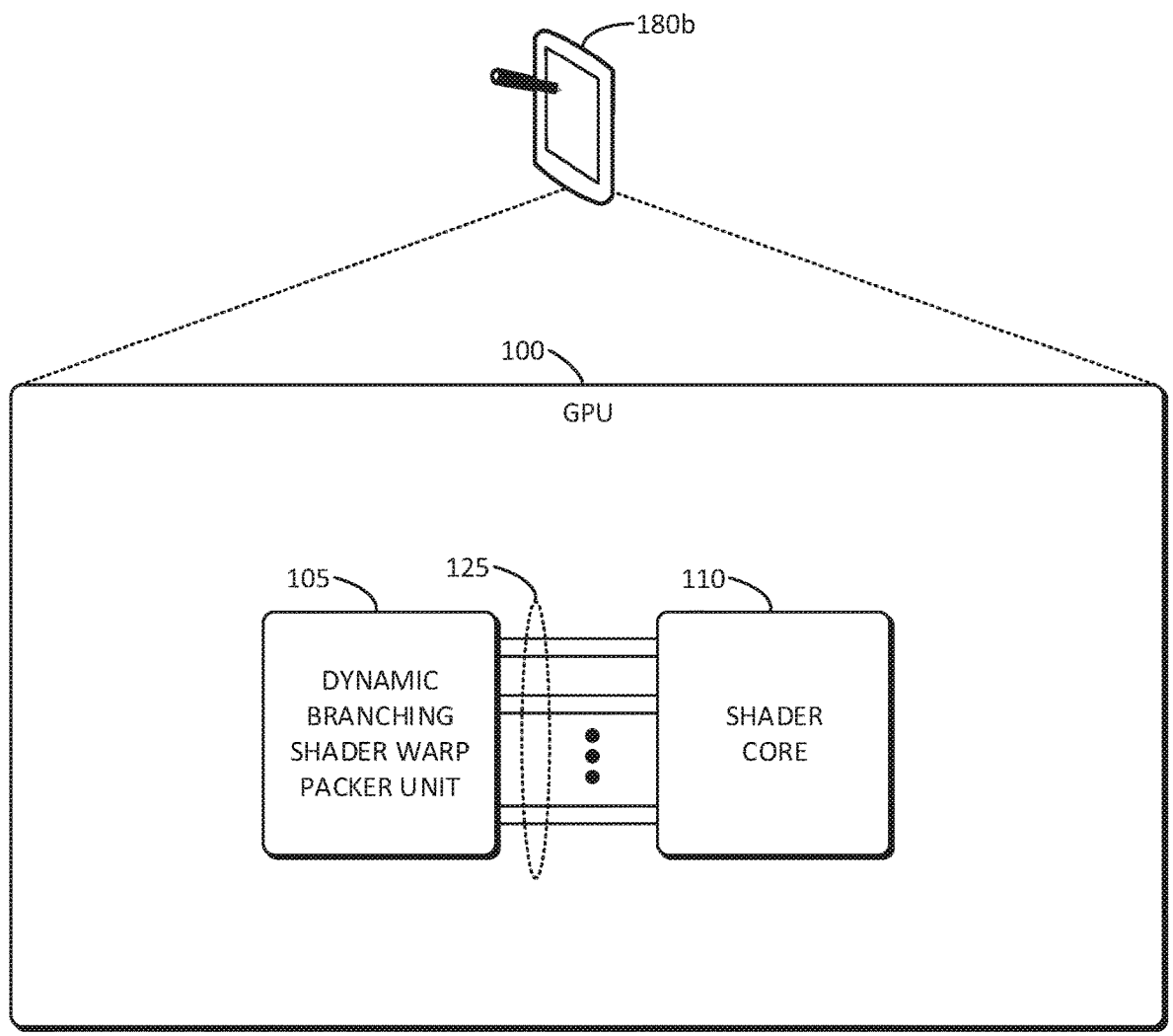
FIG. 1D illustrates a tablet computer including a GPU having the dynamic branching pixel shader warp packer unit of FIG. 1A in accordance with some embodiments.
Figure 1E:
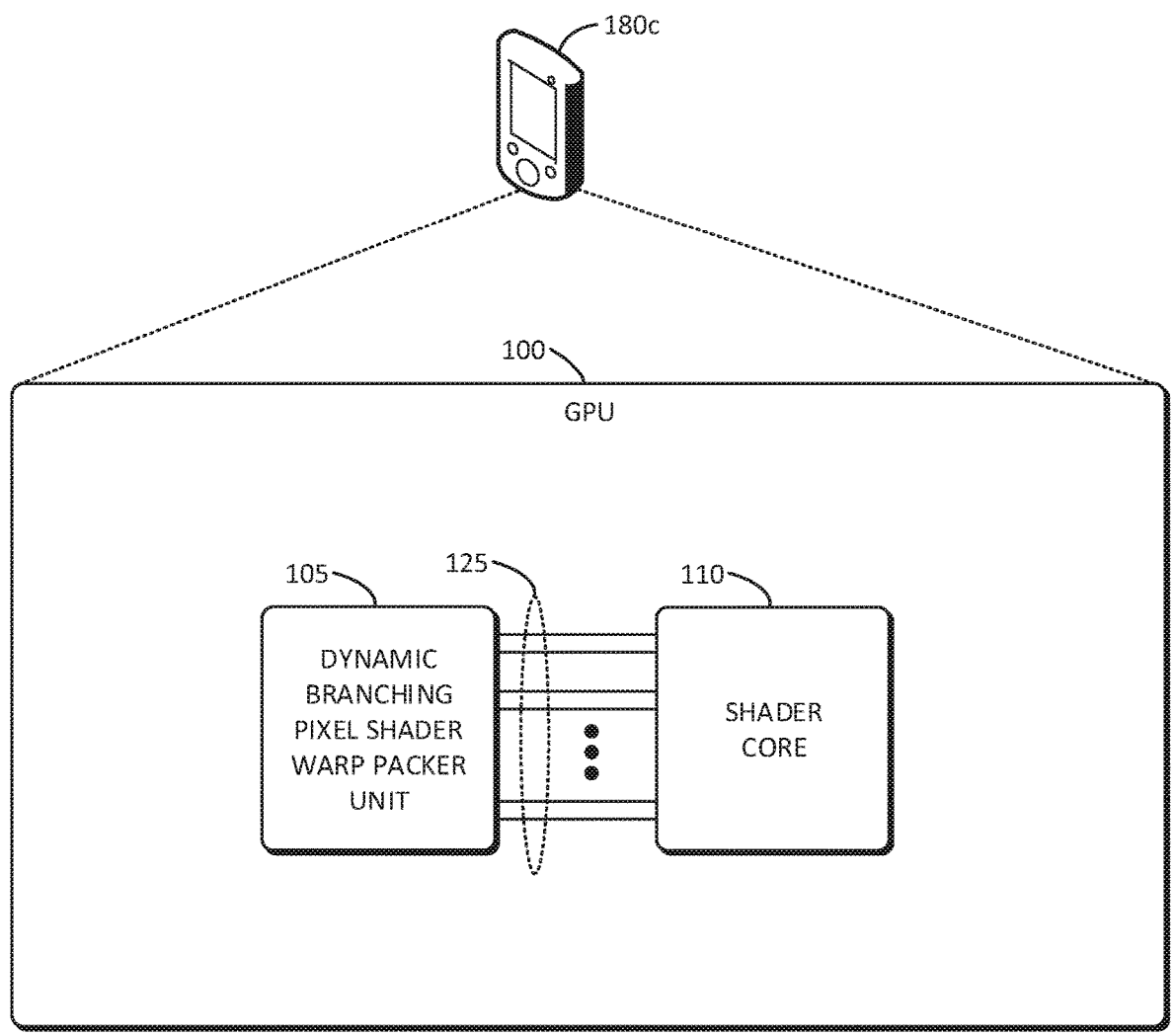
FIG. 1E illustrates a smart phone including a GPU having the dynamic branching pixel shader warp packer unit of FIG. 1A in accordance with some embodiments.

FIG. 1A illustrates a block diagram of a GPU 100 including a dynamic branching pixel shader warp packer unit 105 in accordance with some embodiments. FIG. 1B illustrates a GPU 100 including the dynamic branching pixel shader warp packer unit 105 of FIG. 1A in accordance with some embodiments. FIG. 1C illustrates a mobile personal computer 180a including a GPU 100 having the dynamic branching pixel shader warp packer unit 105 of FIG. 1A in accordance with some embodiments. FIG. 1D illustrates a tablet computer 180b including a GPU 100 having the dynamic branching pixel shader warp packer unit 105 of FIG. 1A in accordance with some embodiments. FIG. 1E illustrates a smart phone 180c including a GPU 100 having the dynamic branching pixel shader warp packer unit 105 of FIG. 1A in accordance with some embodiments. Reference is now made to FIGS. 1A through 1E.

The dynamic branching pixel shader warp packer unit 105 may perform shader occupancy for relatively small primitives (e.g., 130, 135). In some embodiments, 2×2 quads such as quad 115 and quad 120 may each be only partially filled (i.e., partially covered). It will be understood that while reference is generally made herein to 2×2 quads, other sized quads can be used without departing from the inventive concept described. The small primitive 130 only partially fills the 2×2 quad 115. The small primitive 135 only partially fills the 2×2 quad 120. The dynamic branching pixel shader warp packer unit 105 may pack two or more primitives (e.g., 130, 135) into a same 2×2 quad 140. In cases in which multiple primitives' coverage is placed into the same 2×2 quad 140, additional attribute information (e.g., 145) may be packaged and/or stored along with each pixel (e.g., 150) in the 2×2 quad 140, thereby allowing for information that may be needed to calculate directional derivatives (e.g., 160, 165, 192). The technique may include full packing of 2×2 quads from potentially separate primitives (e.g., 130, 135), along with the attribute information (e.g., 145), which can be used to produce information that would have otherwise been produced by missing H pixels in the 2×2 quads, thereby increasing processing efficiency.

Some embodiments disclosed herein improve the efficiency of graphics-intensive operations within the GPU 100, which may involve the use of programmable units and/or fixed-function units such as one or more shader core(s) 110 within the GPU 100. Embodiments disclosed herein may not transfer coverage from one primitive (e.g., 130) to another (e.g., 135), but instead, may provide mechanisms in which coverage from two or more primitives (e.g., 130, 135) may exist in the same 2×2 quad 140, without losing any precision. Additional attribute information (e.g., 145) may be present, and calculations may occur, for the pixels (e.g., 150) within the 2×2 quad 140, which may have coverage from more than one incoming primitive (e.g., 130, 135). Accordingly, small primitive processing efficiency may be improved. Moreover, the use of small and micro-polygons may be increased, thereby resulting in higher geometric complexity and fidelity, such as when used with graphic-intensive gaming applications.

When 2×2 quads (e.g., 115, 120) from two primitives (e.g., 130, 135) do not have overlapping coverage, then the dynamic branching pixel shader warp packer unit 105 may merge the 2×2 quads (e.g., 115, 120) from two different primitives (e.g., 130, 135) and place them within the same 2×2 quad 140. This leads to better warp occupancy. The dynamic branching pixel shader warp packer unit 105 may include a hysteresis window 155, which may collect non-overlapping quads (e.g., 115, 120) from various primitives (e.g., 130, 135). For example, within the hysteresis window 155, various primitives encountered (e.g., 130, 135) may be opportunistically combined into a single same 2×2 quad 140 for processing in the one or more shader cores 110, as further described below. Primitives that are candidates for shared quad processing but that fall beyond the hysteresis window 155 may be processed using conventional techniques, but would not get the benefit of improved shader efficiency. The non-overlapping coverage quality may not be required. In other words, the first partially covered quad 115 and the second partially covered quad 120 may have overlapping coverage, although at the cost of some additional buffering of data while pixels are processed in the one or more shader cores 110.

The dynamic branching shader warp packer unit 105 may receive one or more primitives (e.g., 130, 135), and determine whether at least two partially covered 2×2 quads (e.g., 115, 120) do not have overlapping coverage. According to embodiments disclosed herein, the at least two partially covered 2×2 quads (e.g., 115, 120) can be at a same location or a different location. Spatial proximity is not required. In other words, the partially covered 2×2 quads (e.g., 15, 120) need not be adjacent to each other, and the embodiments disclosed herein may be just as effective even if the partially covered 2×2 quads (e.g., 115, 120) are not in the same or similar location. The dynamic branching shader warp packer unit 105 may pack the at least two partially covered 2×2 quads (e.g., 115, 120) into a packed 2×2 quad (e.g., 140). The dynamic branching shader warp packer unit 105 may send the packed 2×2 quad (e.g., 140) to the one or more shader cores 110 for processing.

In addition, a compiler may be modified to generate a code sequence 170 to support a dynamic branching hybrid mode. The dynamic branching shader warp packer unit 105 may compute directional derivatives (e.g., 160, 165, 192) based on the code sequence 170 using one or more lanes 125. The one or more lanes 125 may be one or more computational threads, for example. The one or more lanes 125 may be processed, for example, by a multi-threaded and/or multi-core microprocessor. The compiler may generate the code sequence 170 to support cross-lane directional derivative computation (e.g., 160) and/or same-lane directional derivative computation (e.g., 165).

Multiple pixels may be piled up into the same lane. For example, the work associated with an H pixel may be mapped onto the same lane as a covered pixel. In some embodiments, H pixel data may be piled on to alive pixels. For example, one (1) or three (3) H pixels may be piled on to alive pixels. A complier may generate code to compute the directional derivative within the same lane along side the code for cross-lane computation. A directional derivative (e.g., 160, 165, 192) may be computed in a cross-lane operation or a same-lane operation. A complier can generate code for both approaches. The particular mode of operation (i.e., same-lane or cross-lane) can be chosen at run time using one or more flags 114, which may be generated and sent by the dynamic branching shader warp packer unit 105 as part of wave packing. The one or more flags 114 can be binary flags, for example.

The dynamic branching shader warp packer unit 105 may pass to the one or more shader cores 110 the packed warp 191 including the coverage map 190 having coverage for each of the 2×2 quads (e.g., 140) in a warp. The warp may have a power-of-two width, such as 16, 32, and 64, and so forth. The dynamic branching shader warp packer unit 105 may provide the one or more flags 114 to the one or more shader cores 110. The one or more flags 114 may be used to control (e.g., provide for a dynamic branch) in the one or more shader cores 110 code for a given pixel (e.g., 150), and thus collectively over four threads, for a given 2×2 quad (e.g., 140). Depending on the quad's coverage and the H pixels present (or not present), the one or more flags 114 may be used to control branches taken regarding the computation of the directional derivatives (e.g., 160, 165, 192). In other words, the compiler may generate the code segment 170 for different scenarios of computing the directional derivatives (e.g., 160, 165, 192) in each pixel, or across pixels, and may select branches among these cases dynamically as directed by the additional attribute information 145, which may be passed along with the 2×2 quad (e.g., 140) from the dynamic branching shader warp packer unit 105.

Responsive to control provided by the dynamic branching shader warp packer unit 105, the one or more shader cores (e.g., 110) and/or each of the lanes 125 can determine whether a horizontal directional derivative or a vertical directional derivative, or both, are computed in the same-lane (e.g., 165) or cross-lane (e.g., 160). This determination can be based on whether horizontal or vertical pixel neighbors in the 2×2 quad 140 are present, and/or based on information available to the dynamic branching pixel shader warp packer unit 105. Accordingly, the dynamic branching pixel shader warp packer unit 105 may generate two bitmasks (e.g., 175, 180), one for each direction. In other words, the dynamic branching pixel shader warp packer unit 105 may generate a bitmask 175 for the vertical direction, and a bitmask 180 for the horizontal direction. The dynamic branching pixel shader warp packer unit 105 may use knowledge of the quad coverage from a primitive to make this determination. Each of the bitmasks (e.g., 175, 180) may include 1 bit per pixel.

Primitives may be rasterized in multiples of a 2×2 quad. One or more 2×2 quads may be packed together into pixel shader warps, which may be sent to the one or more shader cores 110 for execution. Calculating a directional derivative (e.g., 160, 165, 192) may use at least two data values in each of two dimensions. Accordingly, pixels in a 2×2 quad may be used to compute directional derivatives. This directional derivative may be useful in computing a particular level-of-detail (LOD), which may be used in a variety of ways, including determining a map-level of a texture.

In some embodiments, 2×2 quads may also help to reduce texture traffic by exploiting spatial locality between pixels in a 2×2 quad. Accordingly, the GPU 100 may schedule a 2×2 quad into the one or more pixel shader cores 110 even when not all pixels inside the 2×2 quad are occupied. Pixels which are not visible but are used only for the purposes of computing the directional derivative (e.g., 160, 165, 192) may be referred to as H pixels. When the majority of primitives is large, then so too is the majority of 2×2 quads that are fully-filled. Stated differently, embodiments disclosed herein are more important when the majority of the primitives is not large. In some embodiments, large may be defined as covering 10s or 100s of 2×2 quads. The larger a primitive, the smaller the fraction of partially-covered 2×2 quads there are compared to fully-covered (by that primitive) 2×2 quads.

However, when a frame is dominated by micro-polygons (e.g., when a primitive occupies less than a 2×2 quad of pixels), then the lack of full coverage in the 2×2 quad may lead to inefficient GPU shader code utilization. This may also be true for small (but not micro) polygons. Even if the primitives, which are usually triangles, cover two or several 2×2 quads, there may still be a significant percentage of partially-covered 2×2 quads just as a consequence of being triangles rather than rectangular primitives. Embodiments disclosed herein are advantageous for both small and micro primitives.

To address this performance problem, the dynamic branching pixel shader warp packer unit 105 may independently schedule a pixel. This may be made possible by assigning attributes of neighboring pixels in the X and Y directions to the same the pixel. The directional derivative (e.g., 160, 165, 192) may be fully computed in a same-lane operation instead of a cross-lane operation. In an architecture that uses barycentric factors for interpolating the attributes (e.g., at every sample) this can be achieved by copying the barycentric factors 185 of neighboring pixels in the horizontal and vertical directions of a 2×2 quad. In other words, each pixel may now contain three sets of barycentric factors 185: i) one for itself; ii) one for a neighboring pixel along the horizontal direction; and iii) one for a neighboring pixel along the vertical direction. The barycentric factors 185 may be used to compute the attributes for the directional derivative (e.g., 160, 165, 192). This technique may increase register pressure because four additional values may be stored per lane. However, for each set of barycentric factors 185, it is sufficient to store just two of them, while the third value can be computed by subtracting the sum of the two barycentric factors 185 from one (1).

When a pixel (e.g., 150) used for computing a directional derivative (e.g., 160, 165, 192) is part of the primitive's coverage, then the dynamic branching pixel shader warp packer unit 105 need not copy barycentric factors (e.g., 185) of that pixel, and the dynamic branching pixel shader warp packer unit 105 may use cross-lane operations to compute the directional derivative (e.g., 160). When a pixel (e.g., 150) used for computing the directional derivative is not part of a primitive's coverage, then the dynamic branching pixel shader warp packer unit 105 may use single-lane operations to compute the directional derivative (e.g., 165). In this case, the barycentric factors 185, one or more flags 114, and/or a packed warp 191 having a coverage map 190 of the 2×2 quad 140 may be sent to the one or more shader cores 110. The one or more shader cores 110 may use the coverage map 190 to determine whether the horizontal and/or vertical derivatives are computed in a same-lane operation or a cross-lane operation. The one or more shader cores 110 may employ dynamic branching to use either of these paths. Alternatively or in addition, a separate code entry point into a shader program may be provided, which may be preferable if it saves latency and energy associated with executing a dynamic branch instruction. In other words, the dynamic branch may be "performed" external to the shader program by having the program start from different entry points responsive to the coverage map 190 and/or other parameters.

Instead of sending barycentric factors 185, partial differentials 192 may be sent to the one or more shader cores 110, as further described below. The GPU 100 may include a memory 116 to store the directional derivatives. The memory 116 may be a volatile or non-volatile memory or other suitable storage device.

The GPU 100 may include one or more texture units 195. Calculation of the LOD can be performed either in the one or more shader cores 110 or in the one or more texture units 195. When the LOD is implemented outside of the one or more shader cores 110 and performed in the one or more texture units 195, then the additional attribute data (e.g., 145) may be sent from the one or more shader cores 110 to the one or more texture units 195 and/or minor modifications made to the one or more texture units 195. The one or more shader cores 110 may be aware of sample instructions and/or texture operations that may be occurring, and therefore may have access to other texture coordinate information to provide to the one or more texture units 195.

The GPU 100 may include one or more interpolation units 198. Interpolation of the attributes (e.g., 145) can be done using barycentric factors 185 and/or can be performed by the one or more interpolation units 198 using plane equations. In such a case, additional modification to the one or more interpolation units 198 may perform attribute interpolations for H pixels. Further, a map 199 indicating which H pixels may be present and which attributes may be associated with each H pixel may be used by the one or more interpolation units 198.

Figure 2:
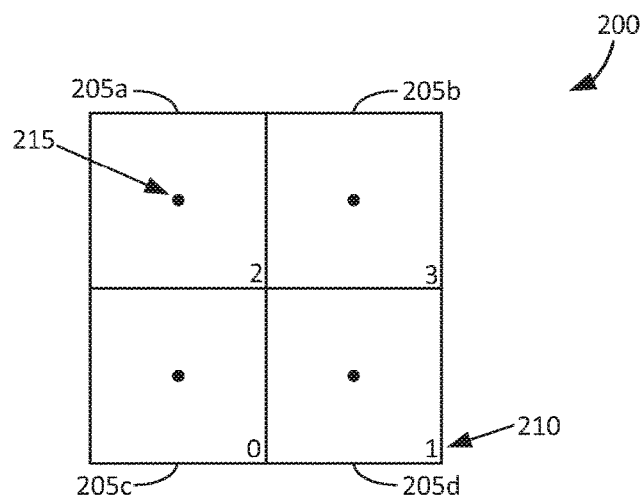
FIG. 2 is a block diagram showing a 2×2 quad in accordance with some embodiments.

FIG. 2 is a block diagram showing a 2×2 quad 200 in accordance with some embodiments. The 2×2 quad 200 may include four pixels 205a, 205b, 205c, and 205d. Each of the pixels may have a center point (e.g., 215). Each of the pixels may have a pixel number (e.g., 210).

Figure 3:
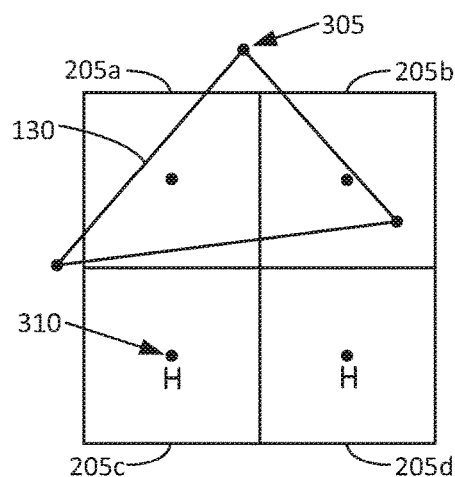
FIG. 3 is a block diagram showing a primitive in a partially-covered 2×2 quad in accordance with some embodiments.
Figure 4:
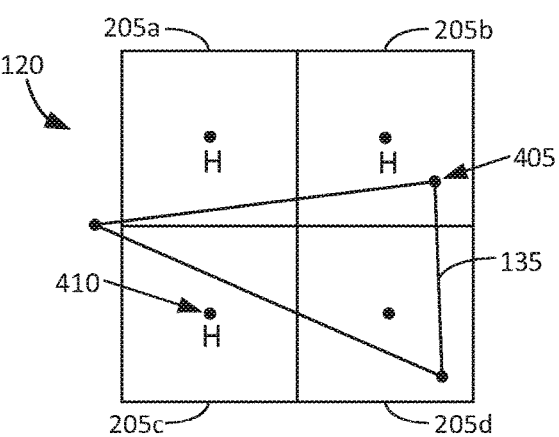
FIG. 4 is a block diagram showing another primitive in another partially-covered 2×2 quad in accordance with some embodiments.

FIG. 3 is a block diagram showing the primitive 130 in a partially-covered 2×2 quad 115 in accordance with some embodiments. FIG. 4 is a block diagram showing the primitive 135 in another partially-covered 2×2 quad 120 in accordance with some embodiments. Reference is now made to FIGS. 1A, 3, and 4.

The 2×2 quad 115 may be filled based on the coverage of arriving primitives. The primitives 130 and 135 may each contribute coverage to a same 2×2 quad 140. The primitives 130 and 135 may each include three vertices (e.g., 305, 405). Conventionally, the 2×2 quad 115 and the 2×2 quad 120 would both need to be individually sent to the one or more shader cores 110. The 2×2 quad 115 would be sent having two upper pixels covered by the primitive 130, and two H pixels (e.g., 310) used for directional derivative calculations. The 2×2 quad 120 would be separately sent having one lower pixel covered by the primitive 135, and three H pixels (e.g., 410) used for directional derivative calculations. Thus, although only three pixels are covered in the 2×2 quads 115 and 120, a total of eight (8) threads would be allocated in the one or more shader cores 110—one for each pixel of each 2×2 quad.

Figure 5:
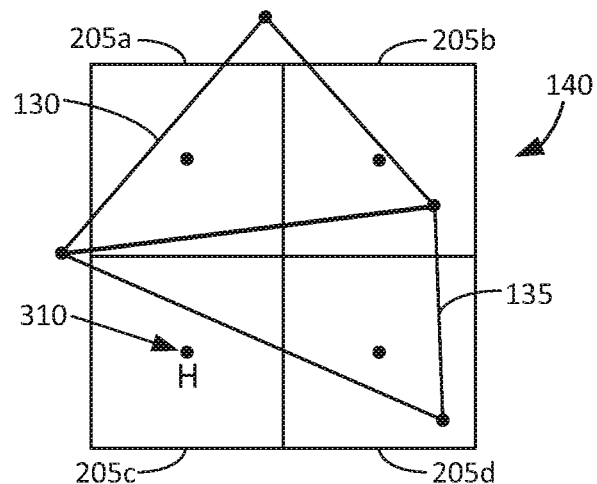
FIG. 5 is a block diagram showing a packed 2×2 quad in accordance with some embodiments.

FIG. 5 is a block diagram showing a packed 2×2 quad 140 in accordance with some embodiments. According to embodiments disclosed herein, H pixels need not be used when the coverage belongs to another adjacent primitive (e.g., 130, 135). For example, as shown in FIG. 5, the primitives 130 and 135 are present in the 2×2 quad 140, and thus only the primitive 130 can have sufficient coverage along with the associated H pixel 310 to provide for directional derivative calculations. However, the primitive 135 has only a single pixel (i.e., 205d) of coverage and no associated H pixels in the 2×2 quad 140. The pixel 205d corresponding to the primitive 135's coverage may be marked as needing two H pixel's worth of additional attribute information (e.g., 145) and/or attribute evaluation by the one or more shader cores 110.

Conventionally, each of the primitives (e.g., 130, 135) would have required all four (4) pixels be sent to the one or more shader cores 110, for a total of eight (8) pixels. Using embodiments disclosed herein, only three (3) or four (4) pixels may be sent to the one or more shader cores 110 rather than eight (8) pixels, while still achieving a completely lossless result.

Figure 6:
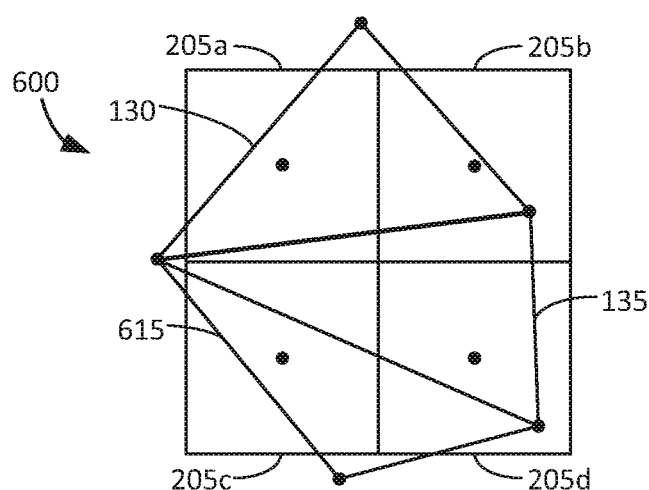
FIG. 6 is a block diagram showing another packed 2×2 quad in accordance with some embodiments.

FIG. 6 is a block diagram showing another packed 2×2 quad 600 in accordance with some embodiments. In this example embodiment, there are three primitives (e.g., 130, 135, and 615) that are present with coverage in the same 2×2 quad 600, and the primitives (e.g., 130, 135, and 615) may not have sufficient pixels in the 2×2 quad 600 for directional derivative calculations to be performed across lanes. Consequently, at least some additional attribute calculations based on the attribute information 145 associated with each pixel of the 2×2 quad 600 may be performed for one or more adjacent pixels. The bitmasks (e.g., 175, 180) may be used to indicate for each of the pixels in the 2×2 quad 600 which neighboring pixels are or are not present for a given primitive (e.g., 130, 135, and 615). This enables the one or more shader cores 110 and/or the one or more texture units 195 to compute the directional derivatives based on the bitmasks (e.g., 175, 180) and/or based on the additional attribute information (e.g., 145).

Thus for the primitive 130, which has horizontally adjacent coverage in the 2×2 quad 600, the horizontal directional derivative calculation may be computed using conventional technology whereas the vertical directional derivative may be computed using an embodiment disclosed herein. The result is the denser packing, as described above, while no unnecessary additional work is placed on a given pixel when there is a neighboring pixel of the same primitive available for the directional derivative calculation. The overloading of additional work may only be present when a covered pixel or helper pixel is not available, the latter due to the particular pixel position being occupied by another primitive with coverage in the same 2×2 quad.

Conventionally, each of the primitives (e.g., 130, 135, and 615) would have required all four (4) pixels be sent to the one or more shader cores 110, for a total of twelve (12) pixels. Using embodiments disclosed herein, only four (4) pixels may be sent to the one or more shader cores 110 rather than twelve (12) pixels, while still achieving a completely lossless result.

Some application programming interfaces (APIs) of GPUS have specific rules about the operations that should and should not be performed for the H pixels that may be present in quads that do not have complete primitive coverage. Specifically, for example, the APIs may specify that the H pixels should not perform any side-effects, such as reads, writes, or atomic accesses to memory. The APIs may also specify that the H pixels should not write any data to render targets, sometimes referred to as "attachments" by some APIs. According to embodiments disclosed herein, such API restrictions are not problematic, and may even be convenient, because they lessen the burden on the compiler regarding the additional code needed for pixels in a quad that do not also have a vertical and/or a horizontal H pixel or actual pixel present.

Barycentric evaluations for attributes may be provided. Regardless of whether the embodiments disclosed herein are invoked, for each pixel sent to the one or more shader cores 110 for processing, post front-end transformation, application-provided attributes may be interpolated to the pixel's location. This may take the form of interpolating a barycentric coordinate pair and using that as the basis for evaluating each of the primitives' attributes at each of the pixel locations. In some embodiments, this evaluation of attributes may be augmented to include the evaluation of the pixel's attributes and also that of one or two immediately adjacent pixels, to serve as directional derivative texture input.

Reference is now made to FIGS. 1A through 7.

Instead of sending barycentric factors 185, partial differentials 192 may be sent to the one or more shader cores 110, which may be used to compute the directional derivatives (e.g., 160, 165, 192). For example, the directional derivatives (e.g., 160, 165, 192) may be determined as follows:

$(x_0, y_o)$, $(x_1, y_1)$, $(x_2, y_2)$ may be the three vertices (e.g., 305, 405, . . . ) of a primitive in screen space. A may be the total area of the primitive (e.g., 130, 135).

Let u, v, w be the three barycentric factors 185 of a point inside the primitive (e.g., 130, 135), thus u+v+w=1.0.

The one or more shader cores 110 and/or the one or more texture units 195 may compute the barycentric factors 185 of the horizontal and vertical pixel neighbors using the following relationships:

$$u_{x-1,y} = u_{x,y} - \frac{y_2}{A} + \frac{y_0}{A} = u_{x,y} - \frac{\partial u}{\partial x}$$

$$u_{x+1,y} = u_{x,y} + \frac{y_2}{A} - \frac{y_0}{A} = u_{x,y} + \frac{\partial u}{\partial x}$$

-continued $$u_{x,y-1} = u_{x,y} - \frac{x_2}{A} + \frac{x_0}{A} = u_{x,y} - \frac{\partial u}{\partial y}$$

$$u_{x,y+1} = u_{x,y} + \frac{x_2}{A} - \frac{x_0}{A} = u_{x,y} + \frac{\partial u}{\partial y}$$

$$v_{x-1,y} = v_{x,y} - \frac{y_1}{A} + \frac{y_0}{A} = v_{x,y} - \frac{\partial v}{\partial y}$$

$$v_{x+1,y} = v_{x,y} + \frac{y_1}{A} - \frac{y_0}{A} = v_{x,y} + \frac{\partial v}{\partial y}$$

$$v_{x,y-1} = v_{x,y} - \frac{y_1}{A} + \frac{y_0}{A} = v_{x,y} - \frac{\partial v}{\partial y}$$

$$v_{x,y+1} = v_{x,y} + \frac{y_1}{A} - \frac{y_0}{A} = v_{x,y} + \frac{\partial v}{\partial y}$$

The partial differentials 192 can be supplied to the one or more shader cores 110, and the one or more shader cores 110 and/or the one or more texture units 195 can compute the barycentric factors 185 of the neighboring pixels to compute the directional derivative (e.g., 160, 165, 192).

Alternatively, the partial differentials 192 can be used to directly compute the directional derivative (e.g., 160, 165, 192). As an example, the computation for one value is shown below. The same technique can be applied to all attributes. As is evident from the derivation below, the directional derivative (e.g., 160, 165, 192) can be computed using two multiplications and one addition, assuming $(t_0-t_2)$ and $(t_1-t_2)$ have already been computed.

$$t_{x,y} - t_{x-1,y} = \{u_{x,y} \times t_0 + v_{x,y} \times t_1 + (1 - u_{x,y} - v_{x,y}) \times t_2\} -$$
$$\{u_{x-1,y} \times t_0 + v_{x-1,y} \times t_1 + (1 - u_{x-1,y} - v_{x-1,y}) \times t_2\} =$$
$$\{u_{x,y} \times (t_0 - t_2) + v_{x,y} \times (t_1 - t_2) + t_2\} -$$
$$\{u_{x-1,y} \times (t_0 - t_2) + v_{x-1,y} \times (t_1 - t_2) + t_2\} =$$
$$\{(u_{x,y} - u_{x-1,y}) \times (t_0 - t_2)\} + \{(v_{x,y} - v_{x-1,y}) \times (t_1 - t_2)\} =$$
$$\frac{\partial u}{\partial x}(t_0 - t_2) + \frac{\partial v}{\partial x}(t_1 - t_2)$$

Sending the barycentric factors 185 and partial differentials 192 may incur the same cost in terms of registers, e.g., four registers. In the former case, computation of the directional derivative (e.g., 160, 165, 192) may incur a cost of two subtractions, two multiplications and one addition, assuming $(t_0-t_2)$ and $(t_1-t_2)$ have already been computed. The latter may involve just two multiplications and one addition since the partial differentials 192 may already be available.

Figure 7:
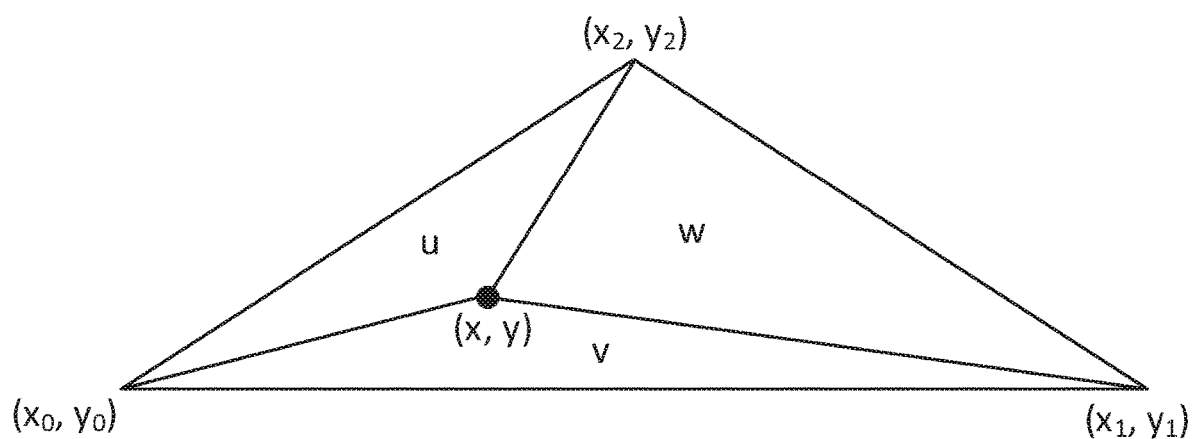
FIG. 7 is a diagram associated with barycentric factor computation of neighboring pixels expressed relative to a pixel at (x,y).

FIG. 7 is a diagram associated with barycentric factor computation of neighboring pixels expressed relative to a pixel at (x,y). The figures may be expressed in equations as follows:

$$u_{x,y} = \frac{(x_0 - x_2)(y - y_0) - (x - x_0)(y_0 - y_2)}{2 \cdot A}$$

$$v_{x,y} = \frac{(x_0 - x)(y_1 - y_0) - (y_0 - y)(x_1 - x_0)}{2 \cdot A}$$

In some embodiments, the following table 1 shows a barycentric factor computation of neighboring pixels expressed relative to the pixel at (x,y):

TABLE 1

| Position | U | V |
|---|---|---|
| (x − 1, y) | $u_{x,y} + \frac{(y_0 - y_2)}{2 \cdot A}$ | $v_{x,y} + \frac{(y_1 - y_0)}{2 \cdot A}$ |
| (x, y − 1) | $u_{x,y} - \frac{(x_0 - x_2)}{2 \cdot A}$ | $v_{x,y} - \frac{(x_1 - x_0)}{2 \cdot A}$ |
| (x + 1, y) | $u_{x,y} - \frac{(y_0 - y_2)}{2 \cdot A}$ | $v_{x,y} + \frac{(y_1 - y_0)}{2 \cdot A}$ |
| (x, y + 1) | $u_{x,y} + \frac{(x_0 - x_2)}{2 \cdot A}$ | $v_{x,y} - \frac{(x_1 - x_0)}{2 \cdot A}$ |
| (x + 1, y + 1) | $u_{x,y} - \frac{(y_0 - y_2)}{2 \cdot A} + \frac{(x_0 - x_2)}{2 \cdot A}$ | $v_{x,y} - \frac{(y_1 - y_0)}{2 \cdot A} + \frac{(x_1 - x_0)}{2 \cdot A}$ |

Let (s,t) be the attributes that need interpolation. To interpolate these attributes at some pixel location (x,y), each attribute's value given by $(s_0,t_0)$, $(s_1,t_1)$, $(s_2,t_2)$ at each of the three vertices, may be combined with the barycentric factors for this pixel as follows.

$$s_{x,y} = s_0 \cdot u_{x,y} + s_1 \cdot v_{x,y} + s_2 \cdot (1 - u_{x,y} - v_{x,y})$$

$$t_{x,y} = t_0 \cdot u_{x,y} + t_1 \cdot v_{x,y} + t_2 \cdot (1 - u_{x,y} - v_{x,y})$$

Combining the equation above with expressions in Table 1, the attribute calculation of neighboring pixels can be expressed as given below.

$$t_{x,y} - t_{x-1,y} = \{u_{x,y} \cdot t_0 + v_{x,y} \cdot t_1 + (1 - u_{x,y} - v_{x,y}) \cdot t_2\} -$$
$$\{u_{x-1,y} \cdot t_0 + v_{x-1,y} \cdot t_1 + (1 - u_{x-1,y} - v_{x-1,y}) \cdot t_2\} =$$
$$\{u_{x,y} \cdot (t_0 - t_2) + v_{x,y} \cdot (t_1 - t_2) + t_2\} -$$
$$\{u_{x-1,y} \cdot (t_0 - t_2) + v_{x-1,y} \cdot (t_1 - t_2) + t_2\} =$$
$$\{(u_{x,y} - u_{x-1,y}) \cdot (t_0 - t_2)\} + \{(v_{x,y} - v_{x-1,y}) \cdot (t_1 - t_2)\} =$$
$$\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\}$$

In some embodiments, the following table 2 shows directional derivative computation given the values at the three corners of the triangle (i.e., primitive):

TABLE 2

| Direction | Directional Derivative Calculation |
|---|---|
| X | $\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\}$ |
| Y | $-\left\{\frac{(x_0 - x_2)}{2 \cdot A} \cdot (t_0 - t_2)\right\} - \left\{\frac{(x_1 - x_0)}{2 \cdot A} \cdot (t_1 - t_2)\right\}$ |

The value $$\frac{(y_0 - y_2)}{2 \cdot A}, \frac{(y_1 - y_0)}{2 \cdot A}, \frac{(x_0 - x_2)}{2 \cdot A}, \frac{(x_1 - x_0)}{2 \cdot A}$$

may already be available with a barycentric interpolation (BCI) unit of a GPU. Such pre-existing data can be copied to a vector register file, and then the calculations above may be reduced to four (4) multiplications and four (4) additions (or subtractions).

Even if the above-referenced four values are unavailable, the BCI may copy the value of $$\frac{1}{2 \cdot A}$$

to a register, and then the number of operations may be reduced to four (4) multiplications and eight (8) additions (or subtractions). Both alternatives may involve allocating an additional four registers to store additional values.

In cases with multiple, small triangles, considerable performance improvement may be achieved based on the implementation of the embodiments disclosed herein. For micro-polygons (i.e., those covering only a single sample), the embodiments disclosed herein may bring the shader rate more in line with the primitive setup rate. The embodiments disclosed herein do not require a massive redesign of the GPU pipeline. Some changes may be made in the pixel packing logic, and some additional software-accessible data may be provided to the shader core for pixel shaders. The techniques disclosed herein are completely lossless. Unlike conventional technologies, there is no change in the visual or numerical results, and thus no need for a heuristic of when applying these techniques may be aesthetically acceptable. In addition, the embodiments disclosed herein may be completely transparent to applications. In other words, applications that run on the GPU 100 need not be changed to receive the benefits of the embodiments disclosed herein. Total latency for a given warp may grow in cases when multiple primitives' coverage may be packed in the same quad, but this is more than offset by other savings.

There may be a break-even point at which the calculations of the H pixels is best computed using explicit threads. There are a few factors which could influence disabling embodiments disclosed herein. Some of the factors include the following. First, the sum of the additional instructions used for interpolating the attributes is more than the threshold of the total number of instructions executed by the one or more shader cores 110. Essentially, the cost of interpolating additional attributes may be relatively high such that packing more threads does not benefit the overall performance. Second, the number of texture accesses needed for the directional derivatives may be more than a certain threshold. In such cases, it may be better to disable embodiments disclosed herein, and instead perform calculations using conventional techniques. However, the trend is towards more complicated pixel shaders, requiring more calculations per thread. The compiler may statically analyze the shader program to determine if it's worth packing multiple primitives into a quad, and if so, set a flag or some other state variable to enable embodiments disclosed herein. In other words, it may be beneficial to switch off the disclosed techniques when the overhead of the disclosed techniques exceeds the benefits. A pixel may be marked as an H pixel, which can be used to indicate where these lanes need to be switched on and where these lanes need to be switched off to avoid unproductive work.

Figure 8:
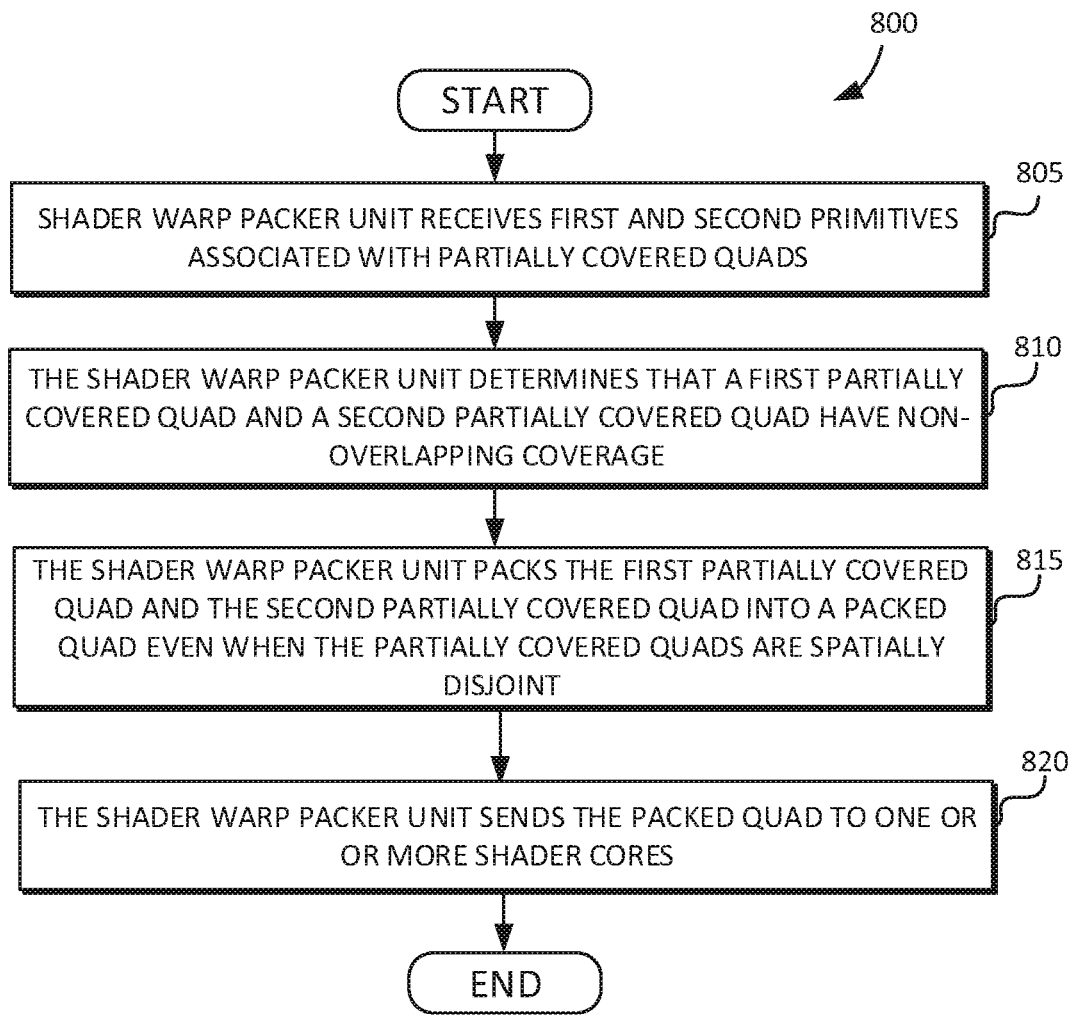
FIG. 8 is a flow diagram illustrating a technique for performing shader occupancy for small primitives in accordance with some embodiments.

FIG. 8 is a flow diagram 800 illustrating a technique for performing shader occupancy for small primitives in accordance with some embodiments. At 805, a shader warp packer unit may receive a first primitive associated with a first partially covered quad, and a second primitive associated with a second partially covered quad. At 810, the shader warp packer unit may determine that the first partially covered quad and the second partially covered quad have non-overlapping coverage. At 815, the shader warp packer unit may pack the first partially covered quad and the second partially covered quad into a packed quad even when the first partially covered quad and the second partially covered quad are spatially disjoint. The term disjoint may imply non-overlapping. At 820, the shader warp packer unit may send the packed quad to one or more shader cores.

Figure 9:
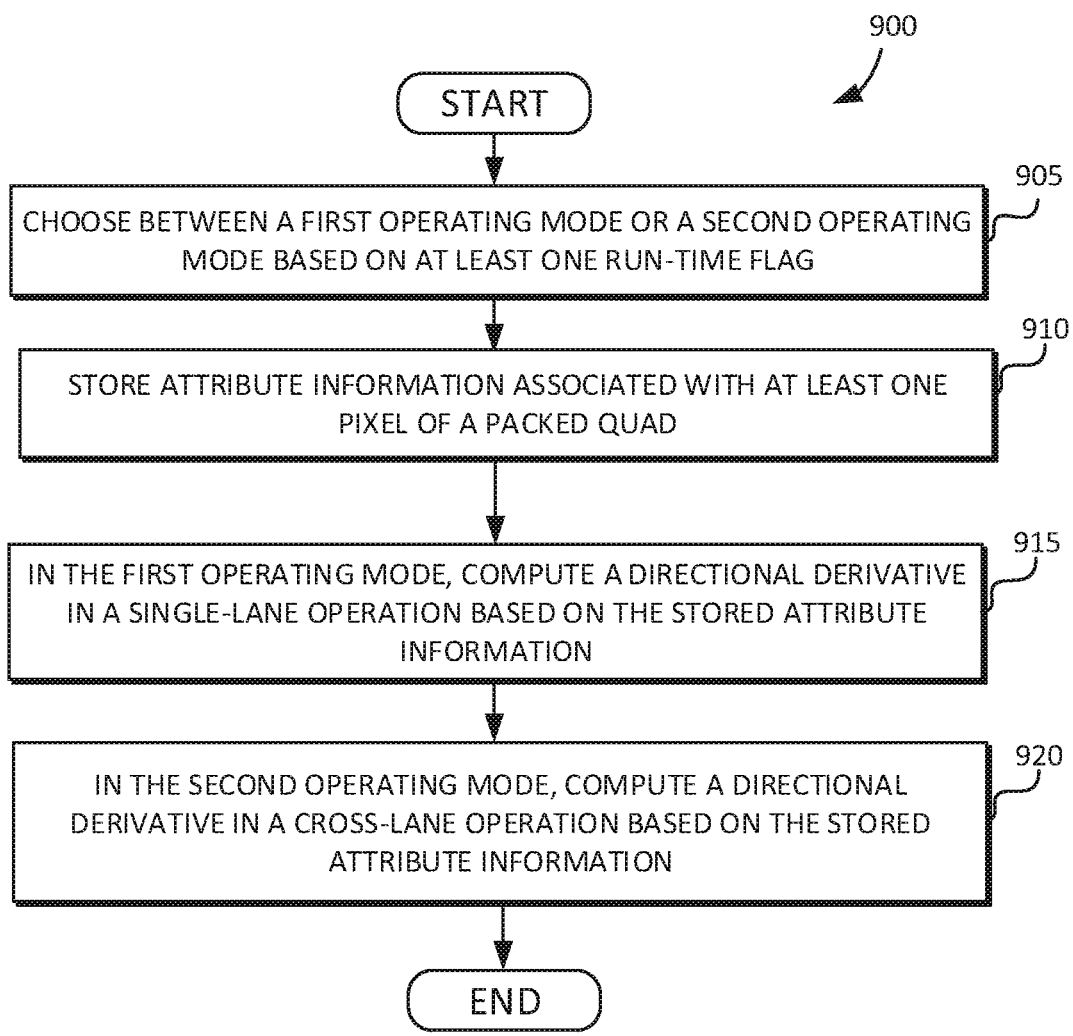
FIG. 9 is a flow diagram illustrating another technique for performing shader occupancy for small primitives in accordance with some embodiments.

FIG. 9 is a flow diagram 900 illustrating another technique for performing shader occupancy for small primitives in accordance with some embodiments. At 905, the shader warp packer unit or the one or more shader cores may choose between a first operating mode or a second operating mode based on at least one run-time flag. At 910, the shader warp packer unit or the one or more shader cores may store attribute information associated with at least one pixel of a packed quad. At 915, in the first operating mode, a directional derivative may be computed in a single-lane operation based on the stored attribute information. At 920, in the second operating mode, a directional derivative may be computed in a cross-lane operation based on the stored attribute information.

It will be understood that the steps of FIGS. 8 and 9 need not be performed in the order shown, and intervening steps may be present.

In some embodiments, a GPU includes one or more shader cores. The GPU may include a shader warp packer unit configured to receive a first primitive associated with a first partially covered quad, and a second primitive associated with a second partially covered quad. In some embodiments, the shader warp packer unit is configured to determine that the first partially covered quad and the second partially covered quad have non-overlapping coverage. In some embodiments, the shader warp packer unit is configured to pack the first partially covered quad and the second partially covered quad into a packed quad. In some embodiments, the shader warp packer unit is configured to send the packed quad to the one or more shader cores. In some embodiments, the first partially covered quad and the second partially covered quad are spatially disjoint from each other. The term disjoint may imply non-overlapping.

In some embodiments, the one or more shader cores are configured to receive and process the packed quad with no loss of information relative to the one or more shader cores individually processing the first partially covered quad and the second partially covered quad. In some embodiments, the shader warp packer unit is configured to assign zero or more pixels from the packed quad to a single lane for a single-lane operation. For example, a single "coverage" pixel may be assigned to a lane, and then zero, one, or two H pixels may be assigned to the same lane. In some embodiments, the shader warp packer unit is configured to cause the shader core(s) to compute a directional derivative in the single-lane operation. In some embodiments, the one or more shader cores are configured to compute a directional derivative in the single-lane operation.

The GPU may include a first operating mode in which at least one of i) the one or more texture units, or ii) the one or more shader cores are configured to compute the directional derivative in the single-lane operation. The GPU may include a second operating mode in which at least one of i) the one or more texture units, or ii) the one or more shader cores are configured to compute a second directional derivative in a cross-lane operation.

In some embodiments, the at least one of i) the shader warp packer unit or ii) the one or more shader cores are configured to choose at least one of the first operating mode or the second operating mode based on at least one run-time flag. In some embodiments, the shader warp packer unit is configured to store attribute information associated with at least one pixel of the packed quad. In some embodiments, at least one of i) the one or more texture units, or ii) the one or more shader cores are configured to compute a directional derivative based on the attribute information. In some embodiments, at least one of i) the one or more texture units, or ii) the one or more shader cores are configured to compute a directional derivative based on one or more barycentric factors. In some embodiments, at least one of i) the one or more texture units, or ii) the one or more shader cores are configured to compute a directional derivative based on one or more partial differentials.

In some embodiments, at least one of i) the one or more texture units or ii) the one or more shader cores are configured to compute a first directional derivative in an X direction according to:

$$\left\{\frac{(y_0 - y_2)}{2 \cdot A} \cdot (t_0 - t_2)\right\} + \left\{\frac{(y_1 - y_0)}{2 \cdot A} \cdot (t_1 - t_2)\right\};$$

and at least one of i) the one or more texture units or ii) the one or more shader cores are configured to compute a second directional derivative in a Y direction according to:

$$-\left\{\frac{(x_0 - x_2)}{2 \cdot A} \cdot (t_0 - t_2)\right\} - \left\{\frac{(x_1 - x_0)}{2 \cdot A} \cdot (t_1 - t_2)\right\}.$$

In some embodiments, A is the area of at least one of the first primitive or the second primitive. In some embodiments, $x_0$, $y_0$, $x_1$, $y_1$, $x_2$, and $y_2$ are coordinates of vertices of the at least one of the first primitive or the second primitive. In some embodiments, $t_0$, $t_1$, and $t_2$ are the values of the "t" attribute at each of the three vertices, (x0, y0), (x1, y1), and (x2,y2), respectively. For each primitive arriving at the rasterizer and then the packer, there may be zero or more attributes to be interpolated across the primitive. The values "s" and "t" may represent two such primitive attributes, and may be written as (s,t) to denote a texture coordinate at some particular pixel in a primitive, having been interpolated from the (s,t) values at each of the three vertices. The GPU 100 may include a memory configured to store the first direction derivative and the second directional derivative.

Some embodiments include a method for performing shader occupancy for small primitives using a GPU. The method may include receiving, by a shader warp packer unit, a first primitive associated with a first partially covered quad, and a second primitive associated with a second partially covered quad. The method may include determining, by the shader warp packer unit, that the first partially covered quad and the second partially covered quad have non-overlapping coverage. The non-overlapping coverage quality may not be required. In other words, the first partially covered quad and the second partially covered quad may have overlapping coverage, although at the cost of some additional buffering of data while pixels are processed in the one or more shader cores. The method may include packing, by the shader warp packer unit, the first partially covered quad and the second partially covered quad into a packed quad. The method may include sending, by the shader warp packer unit, the packed quad to one or more shader cores. In some embodiments, the first partially covered quad and the second partially covered quad are spatially disjoint from each other.

The method may include receiving and processing, by the one or more shader cores, the packed quad with no loss of information relative to the one or more shader cores individually processing the first partially covered quad and the second partially covered quad. The method may include assigning zero or more pixels from the packed quad to a single lane for a single-lane operation. For example, a single "coverage" pixel may be assigned to a lane, and then zero, one, or two H pixels may be assigned to the same lane. The method may include computing a directional derivative in the single-lane operation. The method may include computing, in a first operating mode, by at least one of i) the one or more texture units or ii) the one or more shader cores, the directional derivative in the single-lane operation. The method may include computing, in a second operating mode, by the at least one of i) the one or more texture units or ii) the one or more shader cores, a second directional derivative in a cross-lane operation. The method may include choosing, by at least one of i) the one or more texture units or ii) the one or more shader cores, at least one of the first operating mode or the second operating mode based on at least one run-time flag.

The method may include storing, by the shader warp packer unit, attribute information associated with at least one pixel of the packed quad. The method may include computing, by at least one of i) the one or more texture units, or ii) the one or more shader cores, a directional derivative based on the attribute information.

The method may include computing, by at least one of i) the one or more texture units or ii) the one or more shader cores, a first directional derivative in an X direction according to:

$$\left\{ \frac{(y_0 - y_2)}{2 \cdot A} \cdot (t_0 - t_2) \right\} + \left\{ \frac{(y_1 - y_0)}{2 \cdot A} \cdot (t_1 - t_2) \right\};$$

and computing, by the at least one of i) the one or more texture units or ii) the one or more shader cores, a second directional derivative in a Y direction according to:

$$-\left\{ \frac{(x_0 - x_2)}{2 \cdot A} \cdot (t_0 - t_2) \right\} - \left\{ \frac{(x_1 - x_0)}{2 \cdot A} \cdot (t_0 - t_2) \right\}.$$

In some embodiments, wherein A is a total area of at least one of the first primitive or the second primitive. In some embodiments, $x_0$, $y_0$, $x_1$, $y_1$, $x_2$, and $y_2$ are coordinates of vertices of at least one of the first primitive or the second primitive.

The blocks or steps of a method or algorithm and functions described in connection with the embodiments disclosed herein may be embodied directly in hardware, in a software module executed by a processor, or in a combination of the two. Modules may include hardware, software, firmware, or any combination thereof. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, ASICs, embedded computers, cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

This disclosure encompasses numerous inventive principles relating to shader occupancy. The principles disclosed herein have independent utility and may be embodied individually, and not every embodiment may utilize every principle. Moreover, the principles may be embodied in various combinations, some of which may amplify the benefits of the individual principles in a synergistic manner.

The principles described above with reference to the embodiments illustrated in FIG. 1A through FIG. 9 may be referred to as pixel piling.

Some additional principles of this disclosure relate to methods and/or apparatus for selecting one or more techniques to pack coverage (e.g., pixels, fragments, samples, etc.) into quads or other arrays for further processing in a GPU pipeline. For example, an embodiment may receive, from an application, an indication of a degree to which a portion of an image may contribute to the appearance of the image. Based on this indication, the embodiment may select a coverage packing technique such as pixel piling, quad merge, and/or the like, to process coverage for the portion of the image.

In some embodiments, packing may involve combining coverage from multiple primitives in an array. For example, packing may be implemented with merging (e.g., quad merge), pixel piling, and/or other techniques.

In some embodiments, two or more coverage packing techniques may be selected to implement a hybrid combination of techniques. For example, based on the indication received from the application, an embodiment may select both a merge technique and a piling technique. The merge technique may merge coverage from two different primitives having coverage in a quad. The piling technique may then be used to place coverage from a third primitive in the quad.

In some embodiments, a coverage packing technique may be to simply perform no packing. Thus, the selected packing technique may be to receive coverage and pass the coverage along to a following stage substantially as the coverage was received.

The indication received from the application may be implemented in any form. For example, an indication may be implemented as a suggestion (which may also be referred to as a hint) that may be followed, ignored, assigned a weight, and/or the like. As another example, an indication may be implemented as a directive that may be mandatory to follow. In some embodiments, an indication may be implemented as a hybrid combination of one or more suggestions, directives, and/or the like.

The indication received from the application may relate to any aspect of a portion of an image that may indicate a degree to which a portion of an image may contribute to the image's appearance. For example, in some embodiments, the indication may specify an importance, a quality, a level of interest, a level of detail, and/or the like of the portion of the image. In some embodiments, the indication may specify a variable-rate shading (VRS) level for the portion of the image.

The selection of one or more coverage packing techniques may be implemented in any suitable manner in accordance with the disclosure. For example, an application, programmer, game writer, device manufacturer, and/or the like may be provided with a slider input that, at one end, may select one or more coverage packing techniques that may provide the best available image quality, at the other end may select one or more coverage packing techniques that may provide the greatest available performance improvement and/or power reduction, and at points between the ends may select one or more coverage packing techniques that may provide a tradeoff between quality and power reduction depending on the location between the ends.

As another example, the selection of coverage packing techniques may be implemented by running tests using a variety of criteria for one or more coverage packing techniques (e.g., a set of thresholds for a quad merge technique) and developing a set of criteria that may provide acceptable image quality for a given indication such as a VRS level.

As a further example, the selection of coverage packing techniques may be implemented by developing multiple sets of criteria for a coverage packing technique and indexing or selecting one of the sets of criteria based on the indication from the application.

As yet another example, the selection of coverage packing techniques may be implemented by performing comparisons between a portion of an image processed using a selected coverage packing technique and a reference portion of an image (which may be referred to as a "ground truth" portion of the image) that was processed, for example, without coverage packing. The comparisons may compare image quality, power consumption, and/or the like. The comparisons may be performed offline, at runtime, at pseudo runtime (e.g., when a device is not busy), and/or in any combination thereof. In some embodiments, statistics may be run on the comparison results to develop one or more sets of criteria for selecting one or more coverage packing techniques.

Depending on the implementation details, some embodiments in accordance with this disclosure may provide any number of the following features and/or advantages. Some embodiments may reduce or eliminate dependency on heuristic-based decisions which may improve image quality while improving shader occupancy (in some implementations aggressively). Some embodiments may refine one or more heuristics to enable more aggressive merging of coverage while not incurring undesirable image artifacts. In low spatial resolution regions, coverage may be moved from one primitive to another. Depending on the implementation details, this may reduce or eliminate the use of additional per-lane directional derivative calculations (e.g., because, in some embodiments, primitives may be effectively larger, and thus less likely to use helper pixels).

In some embodiments, existing drivers may be used to implement one or more of the coverage technique selection and implementation features disclosed herein. In some embodiments, a hysteresis window storage memory may be shared by multiple merging methods, thereby amortizing hardware costs over more use cases. In some embodiments, performance improvement may be realized, for example, in cases with multiple, small triangles of coverage.

For micro-polygons (e.g., those covering only a single sample), some embodiments may bring a shader rate more in line with a primitive setup rate. In some embodiments, one or more features in accordance with the disclosure may be implemented with few changes to an existing GPU pipeline infrastructure. For example, a coverage technique selection scheme may be implemented with only minor changes to existing pixel packing logic and/or additional software-accessible data may be provided to a shader core for pixel shaders. Some embodiments may be implemented to be completely lossless and/or to allow for some loss but with a potential benefit of additional computation savings. Some embodiments may be partially or completely transparent to applications already written to support Variable-Rate Shading (VRS).

In some embodiments, additional losses due to the selection of a lossy packing technique such as quad merge may be limited to areas that have been deemed by an application to be low spatial resolution areas. In some embodiments, little or no additional compile-time host-CPU effort may be involved to support a coverage technique selection scheme in accordance with the disclosure. In some embodiments, little or no additional object code may be added to implement one or more of the selected packing techniques.

In a shading stage of a GPU pipeline, an API-provided program may be run for pixels or fragments on a parallel processor shader core. In view of the complexity of some shader programs and/or the substantial percentage of total GPU cost (based, for example, on area, power, design effort, and/or the like) dedicated to the shader cores on which shader programs may be run, it may be beneficial to maintain high or full occupancy of quads in shader warps, e.g., to maintain execution efficiency. Sending partially covered quads to a shader core may result in processing inefficiency as lanes (which may be implemented as threads) corresponding to unoccupied positions in a quad remain idle.

Some embodiments in accordance with this disclosure may selectively utilize one or more coverage packing techniques, in some implementations in a hybrid fashion, to improve shader occupancy. The principles relating to packing technique selection may be applied to any stage of a GPU pipeline, including programmable and/or fixed function units. In some embodiments, the principles relating to packing technique selection may adjust and/or improve the operation of one or more coverage packing techniques, for example, by adjusting one or more criteria for a packing technique. Depending on the implementation details, these principles may improve the overall visual quality and/or the overall power/performance/area (PPA) characteristics of one or more integrated circuit (IC) chips used to implement a GPU or portion thereof.

One type of coverage packing technique that may be used with a packing technique selection scheme in accordance with this disclosure is quad merge, some examples of which are disclosed in U.S. Pat. Nos. 9,721,376 and 9,972,124 which are incorporated by reference. In some embodiments, a quad merge technique may reduce inefficiency by recognizing a partially covered quad, and transferring coverage from one adjacent primitive to the quad of another. This may reduce the total number of quads sent to the shader, and thus, may help reduce total energy consumption. Depending on the implementation details, however, it may result in some reduction in image quality. Moreover, in some embodiments, merging of quads may involve applying one or more heuristic thresholds to control the application of a quad merge technique and thereby reduce or avoid unwanted visual artifacts. Some of the principles of this disclosure may refine one or more of these heuristics to allow for more aggressive merging of coverage while not incurring undesirable image artifacts.

Another type of coverage packing technique that may be used with a technique selection scheme in accordance with this disclosure is pixel piling as described above with respect to FIG. 1A through FIG. 9. In some embodiments of pixel piling, coverage from multiple primitives may be placed in the same quad. However, unlike some other packing techniques, some embodiments of pixel piling may involve little or no loss of precision. Moreover, few or no associated heuristics (e.g., threshold(s)) may be needed to maintain image quality. Additional information may be included with, and/or additional calculations may be performed for, the pixels (or samples) within a quad that has coverage from more than one incoming primitive.

In some embodiments, a packing technique selection scheme in accordance with this disclosure may improve efficiency in cases with small primitives and/or allow for increasing use of small or micro-polygons. Depending on the implementation details, this may be accomplished while allowing the use of multiple merging algorithms, each of which may have relative positive and/or negative aspects, thereby inviting higher geometric complexity and/or fidelity, for example, in various game assets, while maintaining image quality. The multiple merging algorithms may be implemented individually and/or in a hybrid manner. Using multiple packing techniques in a hybrid manner may enable an embodiment to realize advantages while avoiding disadvantages of one or more packing techniques.

Because some embodiments may be driven by explicit information from an application in the form of an indication such as a suggestion or directive, the use of heuristics associated with one or more packing techniques may be reduced. More fully packed quads from potentially separate primitives may be achieved via a combination of packing with auxiliary information that may be used to produce the information that may have been produced by helper pixels in quads, via moving coverage from one primitive to another, or a combination thereof.

In cases in which coverage from multiple primitives is placed into the same quad, the additional information may be packaged along with each pixel in the quad thereby allowing for calculations that may be used for directional derivative calculations. In some embodiments, this may improve or maximize shader lane occupancy and/or reduce or avoid duplicate directional derivative calculations.

Some embodiments of packing technique selection schemes in accordance with the disclosure may use an application-supplied indication (e.g., a suggestion or directive) that may specify a spatial resolution such as a variable-rate shading (VRS) level to select one or more coverage packing techniques to merge or combine coverage from multiple primitives in a quad. In some embodiments, one or more of the selected techniques may be adjusted based on the indication, the coverage to which the one or more selected techniques are applied, and/or the like.

Thus, in some embodiments, responsive to an application-provided variable shading rate, an apparatus according to this disclosure may select one or more (e.g., two) possible merging techniques, or a hybrid thereof, to maintain full occupancy of shader core arrays (e.g., quads or 2×2 blocks of pixels). Therefore, on a quad-by-quad basis, a decision may be made regarding how to pack up to four coverage pixels into a quad and how to assign any potential helper pixels used in corresponding directional derivative calculations.

For purposes of illustration, some embodiments may be described in the context of various implementation details such as pixel piling, quad merge, VRS, shader stages, and/or the like. However, the principles are not limited to these implementation details and may be realized using any other implementation details including coverage packing techniques, shading techniques, arrays (of image elements, e.g., pixels, fragments, samples, etc.) that may be implemented in sizes other than quads (e.g., 3×3, 4×4, 2×4, etc.), GPU stages other than shader stages, and/or the like.

Figure 10:
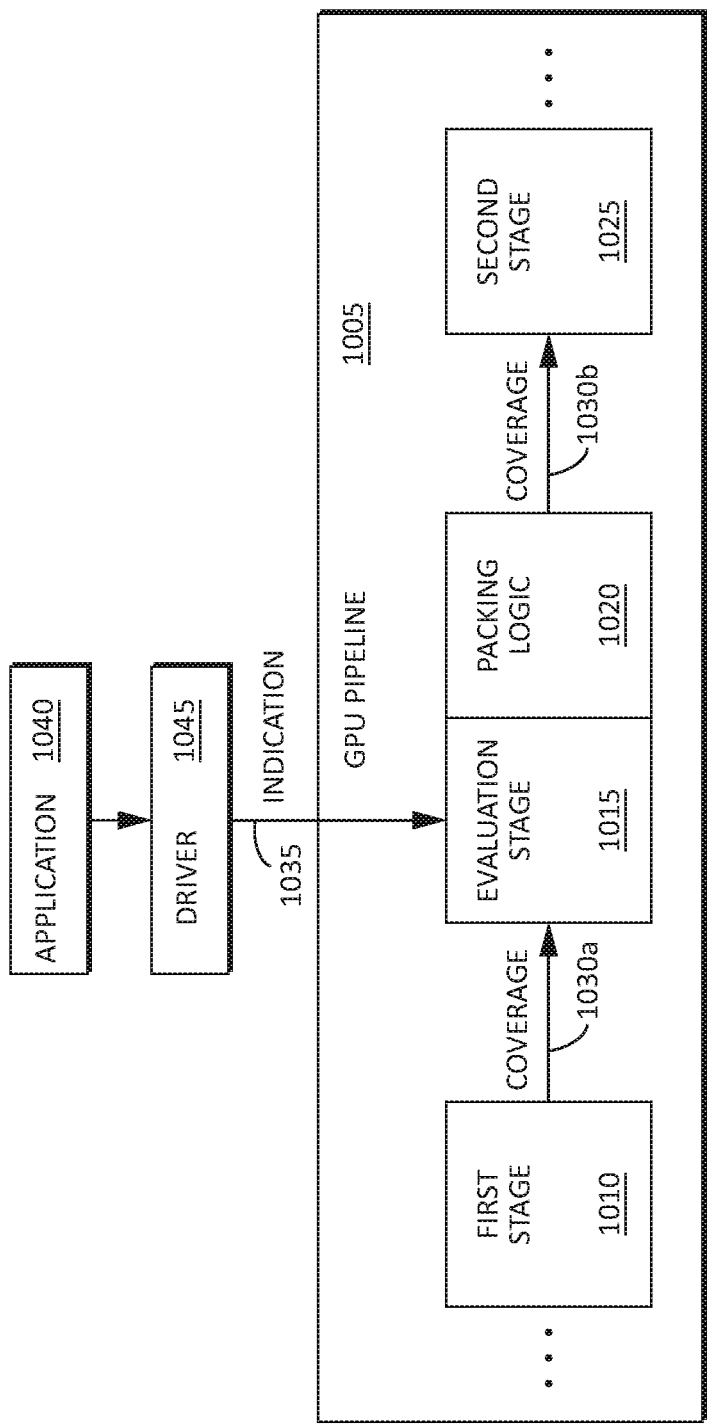
FIG. 10 illustrates an example embodiment of a GPU pipeline with packing technique selection in accordance with some embodiments.

FIG. 10 illustrates an example embodiment of a GPU pipeline with packing technique selection in accordance with the disclosure. The pipeline 1005 illustrated in FIG. 10 may include a first stage 1010, an evaluation stage 1015, packing logic 1020, and a second stage 1025.

In this embodiment, the first stage 1010 may be implemented as a rasterizer, and the second stage 1025 may be implemented as a shader, but the principles may be applied to any other types of stages or units. Some embodiments may include various other apparatus such as a texture address generation and/or filtering unit, a primitive clipping unit, a culling unit, a viewport transforming unit, a binning unit, a rasterization setup unit, a depth comparison unit, a blending unit, and/or the like.

Arrows 1030a and 1030b illustrate coverage flowing through the system. In some embodiments, the flow of coverage 1030b from the packing logic 1020 to the shader 1025 may be implemented with one or more lanes such as the lanes 125 illustrated in FIG. 1A through FIG. 1E.

The evaluation stage 1015 may receive an indication 1035, for example, from an application 1040 through a driver 1045 that may indicate a degree to which a portion of an image may contribute to the image's appearance. Based on this indication, as well as the coverage 1030a received from the rasterizer 1010, the evaluation stage 1015 may select one or more pixel packing techniques such as pixel piling, quad merge, and/or the like, to process the coverage 1030a for the portion of the image.

The evaluation stage 1015 may invoke the one or more selected pixel packing techniques in the packing logic 1020, which may then implement the one or more selected pixel packing techniques to pack the coverage 1030a received from the rasterizer 1010 into one or more quads that may be sent in one or more warps 1030b to the shader 1025.

The embodiment illustrated in FIG. 10 may be used, for example, to implement any of the methods, processes, features, and/or the like, relating to packing technique selection and/or implementation disclosed herein. Although some components may be illustrated as individual components in FIG. 10, in other embodiments, some components may be integrated into single components, and some components illustrated as single components may be implemented as multiple components. For example, in some embodiments, the evaluation stage 1015 and/or the packing logic 1020 may be integral with the rasterizer 1010 or the shader 1025. Moreover, although the flow of coverage is shown proceeding in a single direction, in other embodiments, coverage flow may branch, loop back, and/or pass around components to implement various functions of the GPU 1005.

Figure 11:
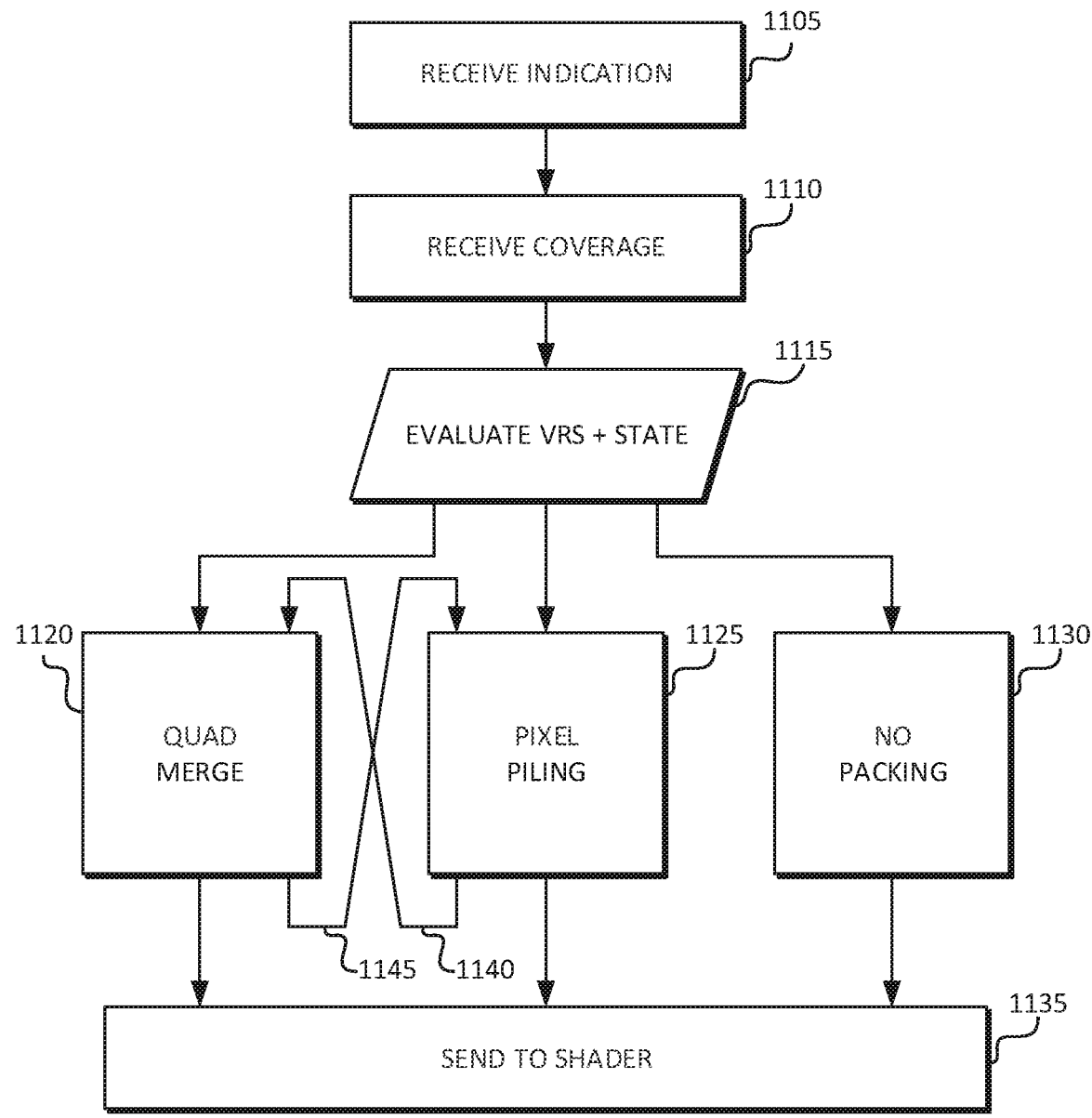
FIG. 11 illustrates a flow chart of an example embodiment of a method for packing coverage in accordance with some embodiments.

FIG. 11 illustrates a flow chart of an example embodiment of a method for packing coverage in accordance with the disclosure. The method illustrated in FIG. 11 may be implemented, for example, using the evaluation stage 1015 and packing logic 1020 illustrated in FIG. 10.

Referring to FIG. 11, the method may begin at operation 1105 where an evaluation stage may receive an indication, for example, from an application running a program with VRS. At operation 1110, the evaluation stage may receive one or more primitives of coverage from a rasterizer. At operation 1115, the evaluation stage may select one or more pixel packing techniques to apply to the coverage based, for example, on a VRS level and/or state specified by the indication received from the application. The VRS level and/or state may indicate a spatial density of pixels such that a high VRS level may indicate a relatively low density of pixels for a specific portion of an image, and a low VRS level may indicate a relatively high density of pixels for the portion of the image. In some embodiments, the evaluation stage may select one or more packing techniques on a quad-by-quad basis. Moreover, the evaluation stage may select one or more packing techniques in a preferential manner, e.g., in which one packing technique may be considered a preferred technique or a fallback technique. For example, in some embodiments, if the coverage is not a candidate for merging coverage (e.g., quad merge), the evaluation stage may fall back to applying a pixel piling technique to the coverage, e.g., if suitable. As another example, in some embodiments, a pixel piling technique may be preferred, and if the received coverage is not suitable for pixel piling, the evaluation stage may fall back to applying a merging technique to the coverage, e.g., if suitable.

The method illustrated in FIG. 11 may then proceed through one or more paths, possibly concurrently, depending on the one or more packing techniques selected at operation 1115. For example, if a quad merge technique is selected for at least part of the portion of the image related to the indication, the method may proceed to operation 1120 where a quad merge operation may be performed on one or more primitives and/or quads. If a pixel piling technique is selected for at least part of the portion of the image related to the indication, the method may proceed to operation 1125 where a pixel piling operation may be performed on one or more primitives and/or quads. If the evaluation operation 1115 determines that some of the received coverage is not a candidate for merging (e.g., through quad merge and/or pixel piling), the method may proceed to operation 1130 in which the selected packing technique is to essentially not perform a packing technique, and any related coverage received at operation 1110 may be passed to a shader at operation 1135 substantially as received.

In some embodiments, coverage may pass through the paths of operations 1120, 1125, and 1130 concurrently (in parallel), sequentially, and/or repetitively, depending on the packing techniques selected at the evaluation operation 1115 for various quads and/or primitives. For example, a quad merge operation 1120 may be performed on a first primitive and a second primitive for a first quad. The first quad may proceed to the pixel piling operation 1125 as shown by arrow 1145 where a pixel piling operation may be performed for a third primitive for the first quad. The first quad may then be sent to a shader at operation 1135. Similarly, a pixel piling operation 1125 may be performed on a fourth primitive and a fifth primitive for a second quad, which may then proceed to the quad merge operation 1120 as shown by arrow 1140. A quad merge operation may then be performed on a sixth primitive for the second quad, which may then be sent to a shader at operation 1135. Any quad may proceed through any of the various paths illustrated in FIG. 11 any number of times, including multiple times through the same and/or different paths, as may be specified by the evaluation operation 1115.

In some embodiments, a quad merge technique such as that illustrated in operation 1120 above may implement one or more fine-tuning criteria that may restrict the use of the quad merge technique to prevent it from being used in certain cases to preserve better image quality. Some examples of these criteria may be as follows.

(1) Coverage may only be merged from primitives having the same face orientation (e.g., both front-facing or both back-facing).

(2) Coverage may only be merged from primitives that have no overlapping pixels in a specific quad.

(3) Coverage may only be merged if the absolute depth values (which may also be referred to as Z values) in the quad from two primitives differ by less than a certain threshold.

(4) Coverage may only be merged if the slopes and/or gradients of the Z values of two primitives differ by less than a certain threshold.

In some embodiments, one or more of these criteria may help to identify and merge quads only in cases where two or more primitives that cover the same quad are approximately coplanar and (thus inferred to be) essentially tessellating the same object and/or surface.

In some embodiments in accordance with the disclosure, one or more of these criteria may be tempered or relaxed to enable more aggressive merging of coverage while still preserving acceptable image quality. This may be facilitated by the availability of the indication (e.g., from an application) of the degree to which a portion of an image corresponding to a quad may contribute to the appearance of the image. For example, a portion of an image with a high VRS rate (which may correspond to a relatively low resolution or spatial density) may indicate that the portion of the image is located in a peripheral region of a foveated scene. Thus, quads used to process primitives located in this portion of the image may be merged based on relaxed versions of one or more of the four criteria (1) through (4), and even though this may result in a reduction in image quality (which in some cases may be slight or unnoticeable), it may still provide adequate overall image quality while, depending on the implementation details, improving performance by helping maintain full occupancy of quads sent to a shader.

In some embodiments in accordance with the disclosure, criterion (1) may be relaxed, for example, by eliminating this restriction in high VRS regions of an image. Depending on the implementation details, this may have a relatively small effect on the results because, if two primitives have different face orientations, one of the primitives may be culled prior to rasterization, and thus, eliminating criterion (1) may have little effect on the image quality. (An exception may be in situations in which face culling is disabled, which may be an uncommon situation.)

In some embodiments in accordance with the disclosure, criterion (2) may be relaxed, for example, by eliminating this restriction in high VRS regions of an image. In some situations, two primitives may have overlapping coverage in a given quad such that one or more pixels in the quad may by covered by both primitives. Depending on the implementation details, merging may be allowed, for example, for portions of an image having a sufficiently high VRS level.

Figure 12:
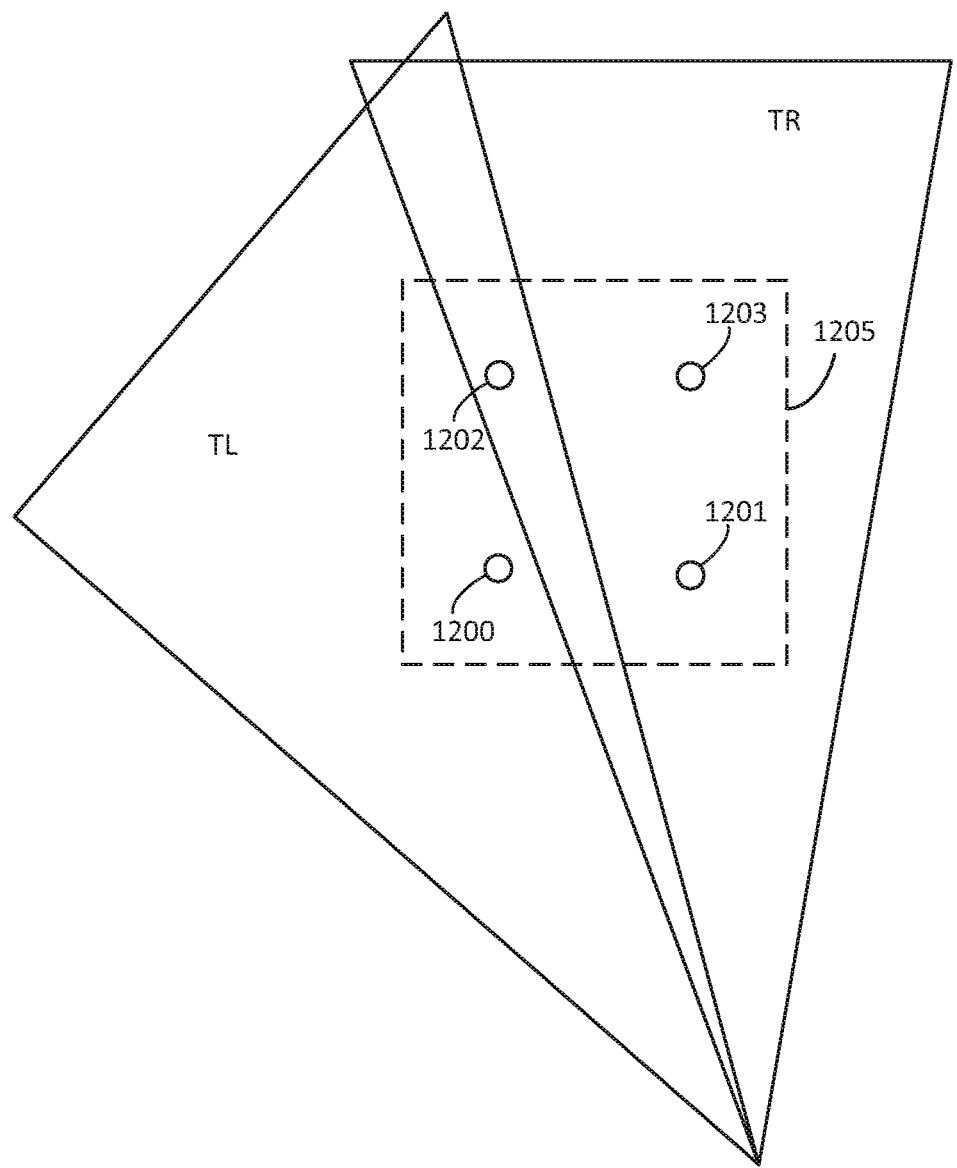
FIG. 12 illustrates an example of a merging operation for primitives having overlapping coverage in a quad coverage in accordance with some embodiments.

FIG. 12 illustrates an example of a merging operation for primitives having overlapping coverage in a quad coverage in accordance with the disclosure. Triangle TR may cover pixel positions 1201, 1202, and 1203 of quad 1205. Triangle TL may cover pixel positions 1200 and 1202 of quad 1205. In a merging operation in accordance with the disclosure, the pixel at position 1202 for triangle TR may be transferred to triangle TL, and the pixel for triangle TL at pixel position may be discarded.

Depending on the implementation details, allowing merging for overlapping coverage as shown in FIG. 12 may improve quad occupancy, but may also result in reduced image quality for the overlapping primitives. However, because the decision to relax criterion (2) may be based on an indication that the primitives are located in a high VRS level portion for the image, the tradeoff between localized image quality and shader occupancy may provide an overall net benefit. Moreover, under some conditions, the entire quad 1205 may be approximated by a single pixel, thereby eliminating or mitigating any reduction in image quality caused by allowing merging with overlapping coverage.

Alternatively, or additionally, in some embodiments, a pixel piling operation such as that illustrated at operation 1125 in FIG. 11 may be allowed to perform pixel piling for overlapping coverage within a quad.

In some embodiments, pixel piling may be considered a form of quad merge. Thus, some embodiments may be described as implementing a primitive transfer (or coverage transfer, coverage shifting, etc.) type of quad merge, or a pixel piling type of quad merge.

In some embodiments, for criteria (3) and (4), the thresholds may be relaxed to allow for more merging than would otherwise be allowed in regions with relatively high VRS (which may correspond to lower spatial density of pixel shading). The thresholds may be provided, for example, by a driver for the GPU running on a host processor and providing an interface for an application through an API. While heuristics may still be used for the base values of depth and depth slope differences between pixels, depending on the implementation details, these values become less critical in that they may be further adjusted and/or tempered by the actual VRS level and thus the overall image quality (e.g., subjective quality) may be maintained while still allowing for additional merging. Moreover, this may allow for additional savings in pixel processing resources.

In some embodiments, only some subsets of the quad merge criteria may be tempered, for example, by VRS information.

In some embodiments, when the criteria (even relaxed criteria) for quad merging based on shifting coverage from one primitive to another primitive are not met, an evaluation stage may select a pixel piling technique which may allow coverage from different primitives to reside in a given quad. However, the use of pixel piling is not limited to situations in which one or more criteria for quad merge are not met. Thus, an evaluation stage may select a pixel piling technique even if all of the criteria for quad merge are met.

For example, in some situations, performing a quad merge by shifting coverage from one primitive to another for a specific quad may result in some image quality variation, but it may add little or no length to a corresponding shader program. However, packing multiple primitives into the same quad may not introduce any image quality issues, but it may lead to a longer execution time for a corresponding shader program. In some embodiments in accordance with the disclosure, an evaluation stage may make a tradeoff between the advantages and/or disadvantages of the two packing techniques based on an indication from an application for the portion of the image in which the primitives may be located. This may be implemented, for example, as a slider as described above in which values at one end may select one or more coverage packing techniques that may provide the best available image quality, and values at the other end may select one or more coverage packing techniques that may provide the greatest available performance improvement and/or power reduction, and values between the ends may select one or more coverage packing techniques that may provide a tradeoff between quality and power reduction depending on the location between the ends. In some embodiments, a VRS level may serve as a value of the slider to select the one or more packing techniques.

In some embodiments, two or more merging schemes (e.g., quad merge and pixel piling) may be applied to arriving coverage associated with a given quad. For coverage for primitives that satisfy one or more of the (possibly relaxed) quad merging criteria (1) through (4), these coverages can be merged, which, depending on the implementation details, may result in effectively fewer primitives in a quad, but with these same primitives covering more of the pixels.

Figure 13A:
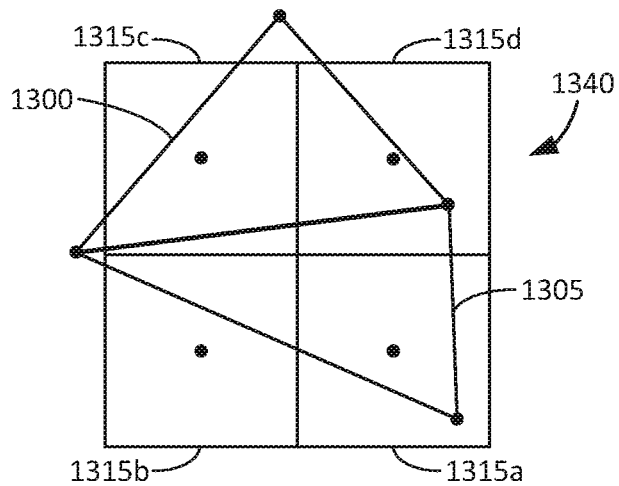
FIG. 13A through FIG. 13C illustrate an embodiment of a hybrid pixel packing technique in accordance with some embodiments.
Figure 13B:
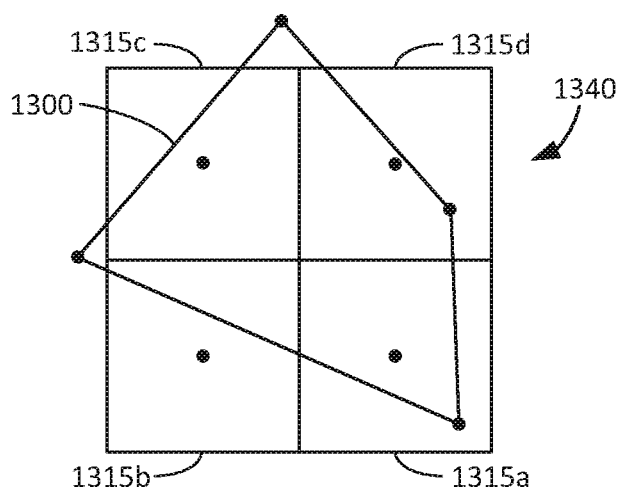
Figure 13C:
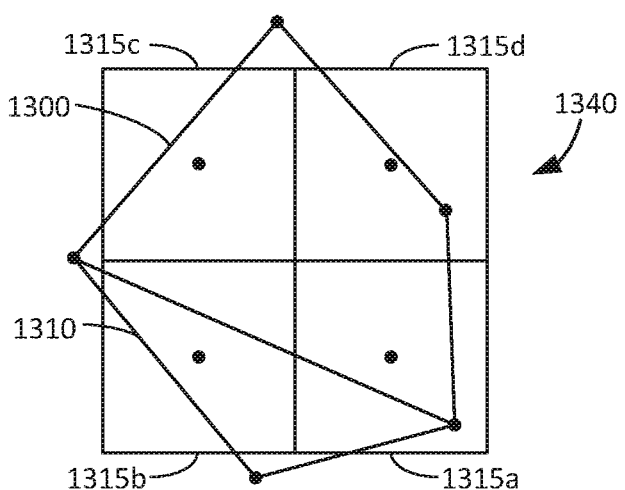

FIG. 13A through FIG. 13C illustrate an embodiment of a hybrid pixel packing technique in accordance with the disclosure. In the embodiment illustrated in FIG. 13A through FIG. 13C, three primitives 1300, 1305, and 1310 may have coverage in a single quad 1340.

Referring to FIG. 13A, triangles 1300 and 1305 may arrive and may be candidates for shifting coverage. For example, the coverage at pixel position 1315*a* may be shifted from triangle 1300 to triangle 1305, effectively creating a single triangle 1300 having three pixels worth of coverage in the quad 1300 as shown in FIG. 13B. (When coverage is shifted from one primitive to another, the resultant primitive may not be exactly triangular shaped, but the overall collection of primitives may still have the same total coverage.)

Referring to FIG. 13C, a third triangle 1310 may arrive and may be placed into the same quad 1300 in a hybrid fashion using a pixel piling technique. Thus, two different quad merging techniques may be used within the same quad 1300.

In some embodiments, when a quad sent to a shader core includes coverage from more than one primitive, directional derivative calculations may be controlled, for example, by one or more of the mechanisms of the pixel piling techniques described above with respect to FIG. 1A through FIG. 9. In other cases, for example, where a quad may include coverage from a single primitive, one or more helper pixels may be used for directional derivative calculations.

In embodiments in which an indication from an application may relate to a VRS level, different tiers of VRS operation may be accommodated as described below with respect to FIG. 14 and FIG. 15. In some embodiments, a VRS-enabled application may send an indication to the GPU to perform different levels of coarse sampling at different levels of graphics building blocks. Some examples of these different levels may include: (a) draw level VRS; (b) per-provoking vertex level VRS (e.g., primitive level); and/or (c) a screen region. In some embodiments, when per-primitive level VRS is specified, a quad merge technique may be applied when both quads are the same sampling level.

Figure 14:
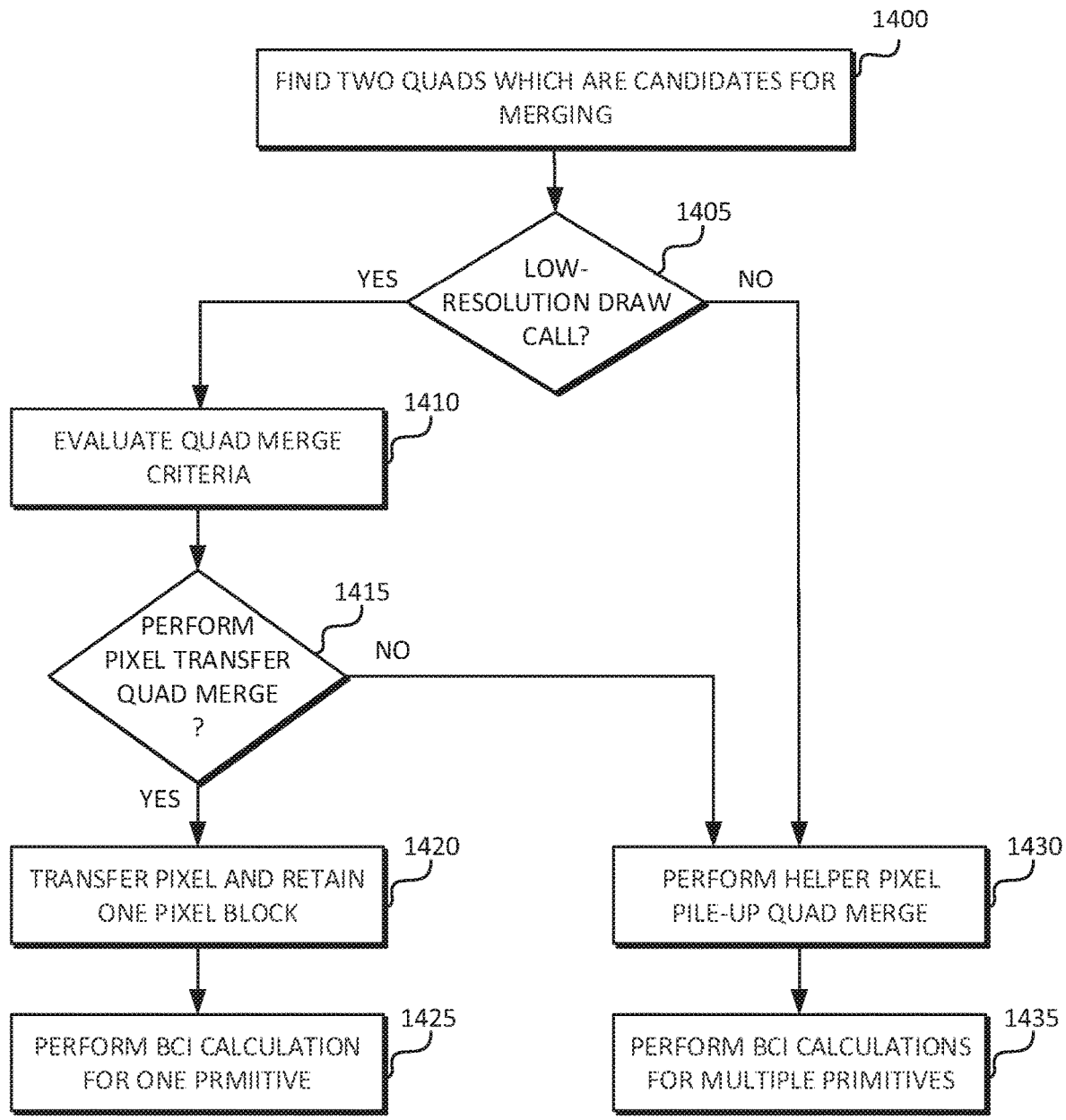
FIG. 14 illustrates an embodiment of a method for selecting and implementing one or more pixel packing techniques for processing coverage in accordance with some embodiments.

FIG. 14 illustrates an embodiment of a method for selecting and implementing one or more pixel packing techniques for processing coverage in accordance with the disclosure. The method illustrated in FIG. 14 may be implemented, for example, using the evaluation stage 1015 and packing logic 1020 illustrated in FIG. 10, but it may also be implemented with other apparatus.

Referring to FIG. 14, at operation 1400, the method may find two quads which are candidates for merging. In some embodiments, this may be accomplished, for example, by finding two blocks of pixels at the same location with non-overlapping coverage. At operation 1405, the method may determine if the VRS operation is for a low-resolution draw call based on a current VRS setting provided by an application. If the operation is for a low-resolution draw call, the method may proceed to operation 1410 where quad merge criteria may be evaluated for the two quads. For example, the values of the Z depth and Z slope may be compared to respective thresholds. Based on this evaluation, the method may determine at operation 1415 if a quad merge based on transferring a pixel from one primitive to another may be performed. If a quad merge may be performed, the method may proceed to operation 1420 where a pixel transfer is performed on one pixel block is retained. The method may then proceed to operation 1425 where one or more barycentric interpolation (BCI) operations may be performed for one primitive.

If, at operation 1415, the method determines that a quad merge may not be performed, it may proceed to operation 1430 where a helper pixel pile-up quad merge may be performed. The method may then proceed to operation 1435 where one or more BCI operations may be performed for multiple primitives having coverage in the quad.

If, at operation 1405, the method determines that the operation is not for a low-resolution draw call, the method may proceed to operations 1430 and 1435 as described above.

Figure 15:
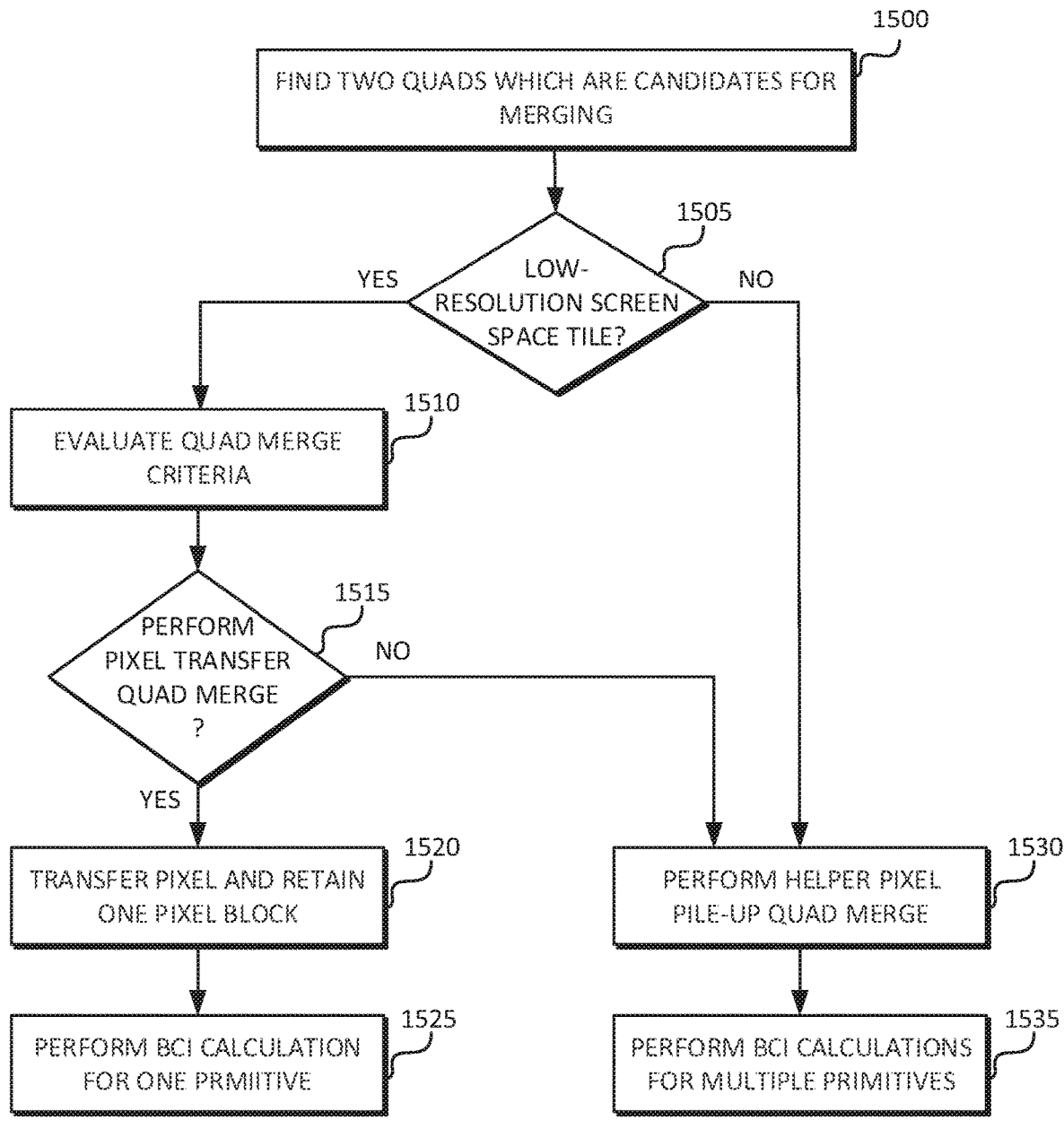
FIG. 15 illustrates an embodiment of a method for selecting and implementing one or more pixel packing techniques for processing coverage in accordance with some embodiments.

FIG. 15 illustrates an embodiment of a method for selecting and implementing one or more pixel packing techniques for processing coverage in accordance with the disclosure. The method illustrated in FIG. 15 may be implemented, for example, using the evaluation stage 1015 and packing logic 1020 illustrated in FIG. 10, but it may also be implemented with other apparatus.

The embodiment illustrated in FIG. 15 is similar to that illustrated in FIG. 14, except that operation 1505 may determine if the VRS operation is for a low-resolution screen space tile.

Referring to FIG. 15, at operation 1500, the method may find two quads which are candidates for merging. In some embodiments, this may be accomplished, for example, by finding two blocks of pixels at the same location with non-overlapping coverage. At operation 1505, the method may determine if the VRS operation is for a low-resolution screen space tile based on a current VRS setting provided by an application. If the operation is for a low-resolution screen space tile, the method may proceed to operation 1510 where quad merge criteria may be evaluated for the two quads. For example, the values of the Z depth and Z slope may be compared to respective thresholds. Based on this evaluation, the method may determine at operation 1515 if a quad merge based on transferring a pixel from one primitive to another may be performed. If a quad merge may be performed, the method may proceed to operation 1520 where a pixel transfer may be performed and one pixel block may be retained. The method may then proceed to operation 1525 where one or more barycentric interpolation (BCI) operations may be performed for one primitive.

If, at operation 1515, the method determines that a quad merge may not be performed, it may proceed to operation 1530 where a helper pixel pile-up quad merge may be performed. The method may then proceed to operation 1535 where one or more BCI operations may be performed for multiple primitives having coverage in the quad.

If, at operation 1505, the method determines that the operation is not for a low-resolution screen space tile, the method may proceed to operations 1530 and 1535 as described above.

The operations and/or components described with respect to the embodiment illustrated in FIG. 14 and FIG. 15, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

In some embodiments in accordance with the disclosure, hysteresis storage (e.g., physical memory) may be shared (e.g., hardware costs may be amortized) between different coverage packing techniques. For example, a structure such as a memory space instantiated for one packing technique may be used by another packing technique in a hybrid packing method as described above. Depending on the implementation details, this may reduce overhead associated with the memory space or other structure. In some embodiments, no additional calculations beyond what is needed for either of the individual packing techniques may be needed to implement a hybrid technique. In some embodiments, modifications may be made to threshold parameters without needing to introduce additional calculations to evaluate the thresholds. Moreover, depending on the implementation details, modification of any of the parameters mentioned above may be trivial, such as doubling or halving values, which may be relatively inexpensive floating-point operations.

In some embodiments, and depending on the implementation details, a potential advantage of the coverage technique selection features disclosed herein is that they may be implemented by making relatively minor changes to existing hardware and/or software. For example, while packing warps with a pixel shader warp packer unit, different types of quads generated by any of the packing techniques described above (e.g., primitive transfer type of quad merge, pixel piling type of quad merge, no quad merge, etc.) may be placed in the same warp. This may be enabled, for example, by enclosing additional instruction set architecture (ISA)-level shader instructions for pixel-piling quad merge in a conditional (if) statement construct. In some embodiments, such a conditional statement may be controlled by one or more flags which may indicate whether quad merge is present and, if so, the type of quad merge. Thus, in some embodiments, the rest of the code remains invariant. In some embodiments, however, additional instructions may be executed may a pixel piling technique.

Another example of minor changes to existing infrastructure may be compiler modifications that may be made to generate code to support a hybrid combination of coverage packing techniques. Such changes may be relatively simple to implement by combining code from the individual techniques. Moreover, in some embodiments, drivers for GPUs implementing any of the coverage technique selection features may be used without modification. (An exception may be minor modifications to enable an application to completely disable the entire coverage technique selection feature.

As another example of a minor change to existing hardware, in some embodiments, a hysteresis window, e.g., within the packing logic, may be used to collect non-overlapping quads from various primitives for more than one type of packing technique. Mechanisms for collecting adjacent primitives sharing non-overlapping coverage in a quad may provide for a hysteresis window within which period various primitives encountered may be opportunistically combined into a single quad for processing in the shader core.

Figure 16:
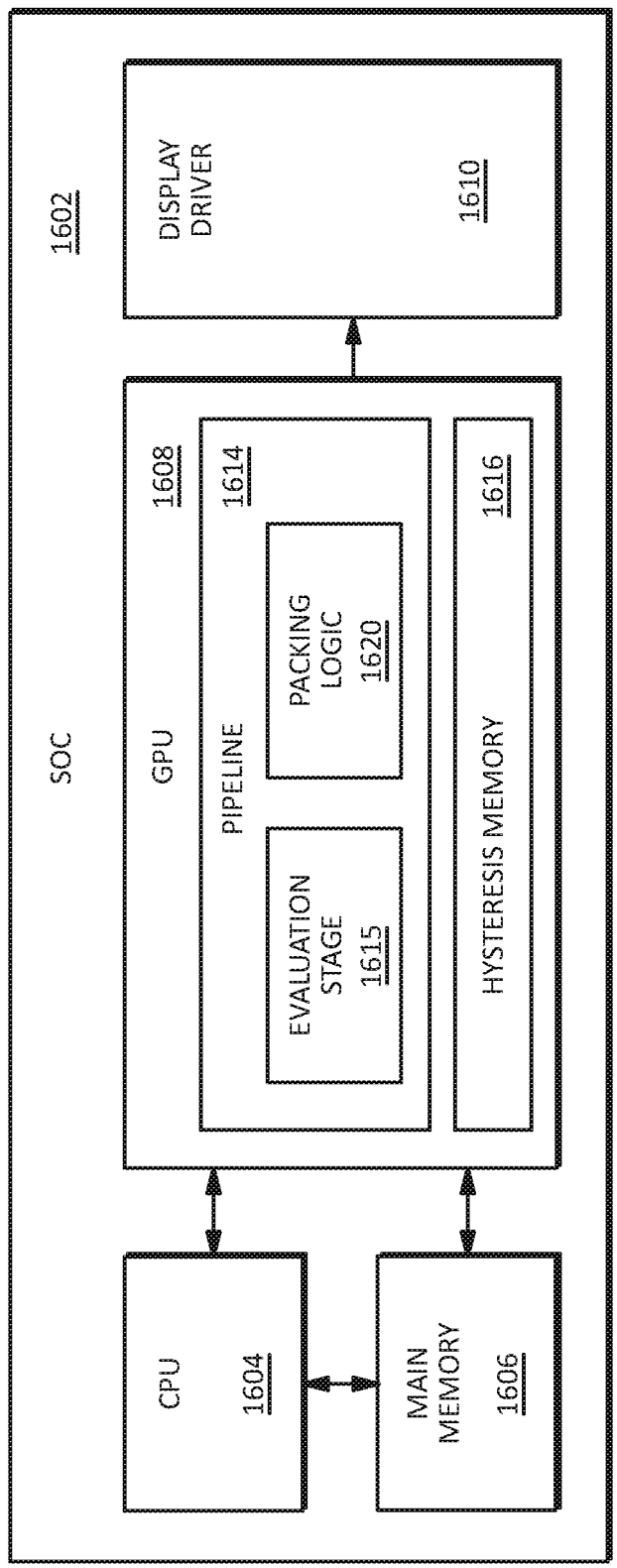
FIG. 16 illustrates an embodiment of a system-on-chip (SOC) device including a GPU that may implement packing technique selection in accordance with some embodiments.

FIG. 16 illustrates an embodiment of a system-on-chip (SOC) device including a GPU that may implement packing technique selection in accordance with the disclosure. The SOC 1602 may include a central processing unit 1604, a main memory 1606, a GPU 1608, and a display driver 1610. The GPU 1608 may include a pipeline 1614 having an evaluation stage 1615 and packing logic 1620. The GPU may further include a memory 1616 for hysteresis window storage that may be shared, for example, by various packing techniques implemented by the evaluation stage 1615 and packing logic 1620. The SOC 1602 may be used, for example, to implement any of the coverage packing technique selection and implementation features disclosed herein. The SOC 1602 illustrated in FIG. 16 may be integrated, for example, into an image display device such as the embodiment illustrated in FIG. 17.

The evaluation stage 1615 and packing logic 1620 illustrated in FIG. 16, as well as those illustrated in FIG. 10, may be implemented with hardware, software, or any combination thereof. For example, in some embodiments that may be implemented at least partially with hardware, the control logic may include circuitry such as combinational logic, sequential logic, one or more timers, counters, registers, state machines, volatile memory such as dynamic random access memory (DRAM) and/or static access memory (SRAM), nonvolatile memory such as flash memory, complex programmable logic devices (CPLDs), field programmable gate arrays (FPGAs), application specific integrated circuits (ASICs), complex instruction set computer (CISC) and/or reduced instruction set computer (RISC) processors executing instructions, and/or the like, to perform their respective functions.

Figure 17:
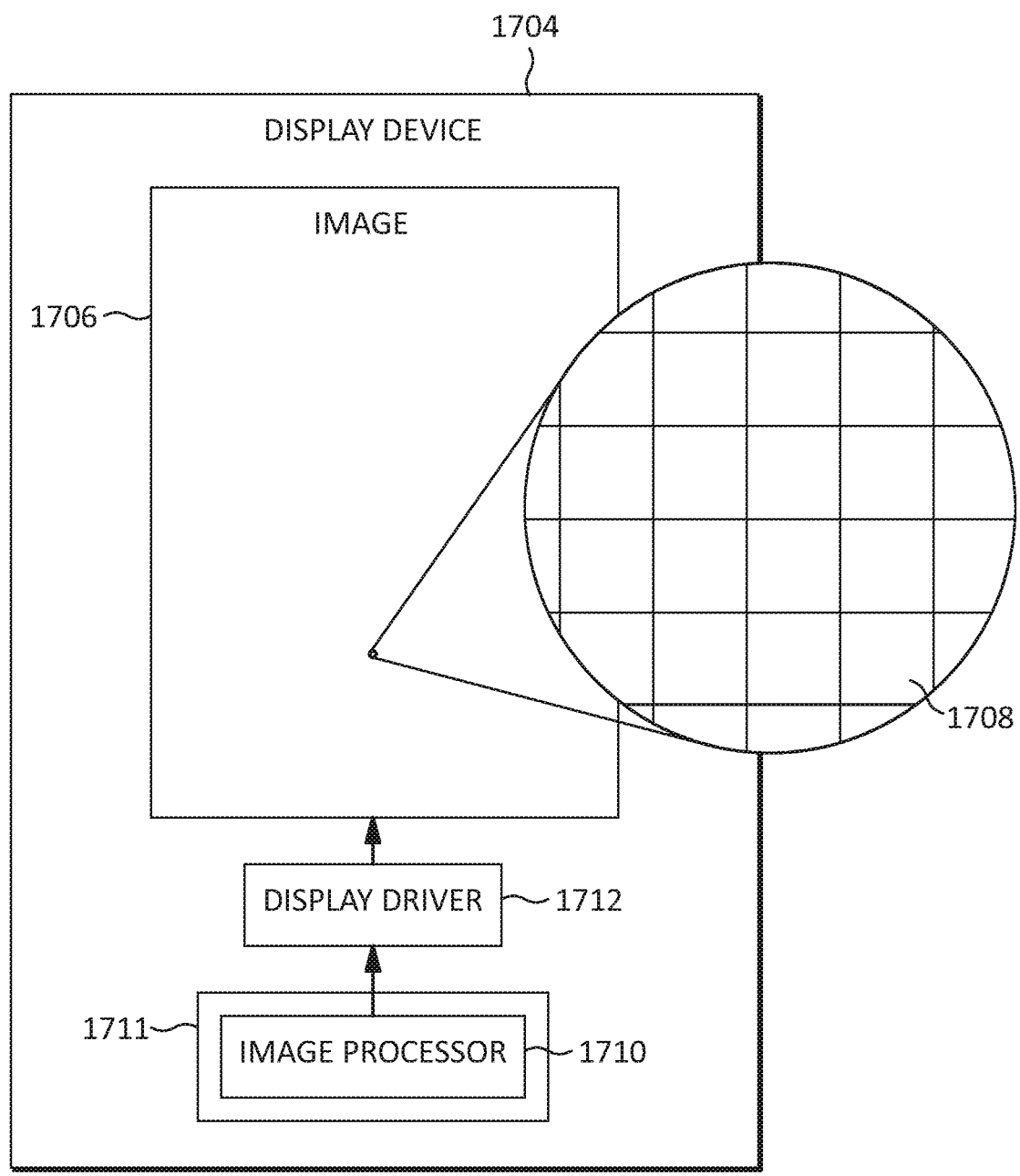
FIG. 17 illustrates an embodiment of an image display device into which any of the methods or apparatus described in this disclosure may be integrated.

FIG. 17 illustrates an embodiment of an image display device 1704 into which any of the methods or apparatus described in this disclosure may be integrated. The display device 1704 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 1706 with pixels. An image processor 1710 such as graphics processing unit (GPU) and/or driver circuit 1712 may process and/or convert the image to a form that may be displayed on or through the imaging device 1704. A portion of the image 1706 is shown enlarged so pixels 1708 are visible. Any of the methods or apparatus described in this disclosure may be integrated into the imaging device 1704, processor 1710, and/or display driver circuit 1712 to generate pixels 1708 and/or groups thereof. In some embodiments, the image processor 1710 may include a pipeline having an evaluation stage and coverage packing logic, for example, on an integrated circuit 1711. In some embodiments, the integrated circuit 1711 may also include the driver circuit 1712 and/or any other components that may implement any other functionality of the display device 1704.

Figure 18:
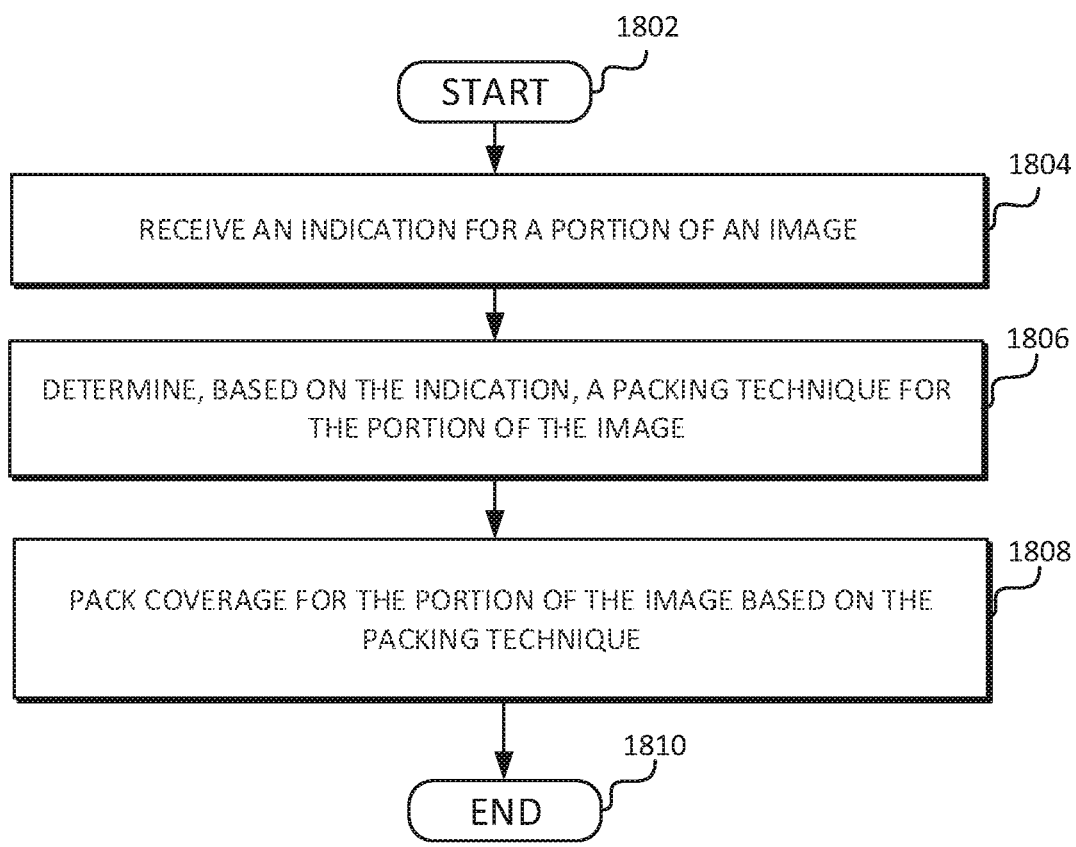
FIG. 18 illustrates an embodiment of a method of packing coverage in a GPU according to some embodiments.

FIG. 18 illustrates an embodiment of a method of packing coverage in a GPU according to this disclosure. The method may begin at operation 1802. At operation 1804, the method may receive an indication for a portion of an image. At operation 1806, the method may determine, based on the indication, a packing technique for the portion of the image. At operation 1808, the method may pack coverage for the portion of the image based on the packing technique. The method may terminate at operation 1810.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

The invention claimed is:

1. A method of processing coverage in a graphics processing unit (GPU), the method comprising:
   receiving first coverage for at least a portion of a first primitive;
   receiving second coverage for at least a portion of a second primitive, wherein the portion of the first primitive and the portion of the second primitive are associated with a portion of an image;
   receiving an indication for the portion of the image;
   determining, based on the indication, a technique for combining the first coverage and the second coverage; wherein the determining includes:
      selecting a first set of criteria for the technique based on the indication, and
      selecting the technique based on the first set of criteria;
   modifying the first set of criteria based on the indication to generate a modified set of criteria; and
   combining the first coverage and the second coverage in an array based on the selected technique using the modified set of criteria.

2. The method of claim 1, wherein the technique comprises array merging.

3. The method of claim 1, wherein the technique comprises pixel piling.

4. The method of claim 1, wherein the first primitive and the second primitive belong to the same draw call.

5. The method of claim 1, wherein the technique shifts coverage from the first primitive to the second primitive.

6. The method of claim 1, wherein the portion of the image comprises a first portion of the image, and the determining comprises comparing the first portion of the image to a second portion of the image.

7. The method of claim 6, wherein the second portion of the image comprises a reference portion.

8. The method of claim 6, wherein comparing the first portion of the image to the second portion of the image comprises comparing a first quality of the first portion of the image to a second quality of the second portion of the image.

9. The method of claim 6, wherein comparing the first portion of the image to the second portion of the image comprises comparing a first power consumption of the first portion of the image to a second power consumption of the second portion of the image.

10. The method of claim 6, wherein comparing comprises comparing in a pseudo running state.

11. The method of claim 1, wherein the technique comprises a first technique, the method further comprising:
   determining, based on the indication, a second technique for the portion of the image; and
   combining coverage for the portion of the image in the array based on the second technique.

12. The method of claim 11, wherein:
   the first technique stores data in a memory; and
   the second technique uses data stored in the memory.

13. The method of claim 11, wherein determining the second technique comprises:
   selecting a second set of criteria for the second technique based on the indication; and
   selecting the second technique based on the second set of criteria.

14. The method of claim 13, wherein:
   the first set of criteria are for a first part of the portion of the image; and
   the second set of criteria are for a second part of the portion of the image.

15. The method of claim 11, wherein combining coverage for the portion of the image based on the second technique comprises shifting an image element between two primitives.

16. An apparatus comprising a graphics processing pipeline comprising:
   an evaluation stage configured to:
      receive an indication for a portion of an image;
      determine, based on the indication, a packing technique for the portion of the image by performing the following:
         selecting an initial set of criteria for the packing technique based on the indication, and
         selecting the packing technique based on the initial set of criteria; and
      modify the initial set of criteria based on the indication to generate a modified set of criteria; and
   a coverage packing stage configured to:
      receive coverage for the portion of the image; and
      pack the coverage based on the selected packing technique using the modified set of criteria.

17. The apparatus of claim 16, wherein:
   the packing technique comprises a first packing technique;
   the evaluation stage is configured to determine, based on the indication, a second packing technique for the portion of the image; and
   the coverage packing stage is configured to pack the coverage based on the second packing technique.

18. A method of combining coverage in a graphics processing unit (GPU), the method comprising:
   receiving a first primitive having a first coverage in an array of image elements;
   placing a first image element of the first primitive at a first position in the array;
   receiving a second primitive having a second coverage in the array, wherein the second primitive has a second image element overlapping with the first image element at the first position in the array;
   receiving an indication for a portion of an image comprising the first primitive and the second primitive;
   selecting, based on the indication, a first set of criteria for a technique for combining the first coverage and the second coverage;
   selecting the technique based on the first set of criteria;
   modifying the first set of criteria based on the indication to generate a modified set of criteria;
   combining the first coverage and the second coverage in the array based on the selected technique using the modified set of criteria; and
   placing a third image element of the second primitive at a second position in the array.

19. The method of claim 18, wherein placing the third image element is based on receiving the indication.

* * * * *